United States Patent
Mimura et al.

(10) Patent No.: US 8,611,017 B2
(45) Date of Patent: Dec. 17, 2013

(54) ZOOM LENS SYSTEM AND IMAGE PICKUP DEVICE HAVING THE SAME

(75) Inventors: Takayuki Mimura, Kawasaki (JP); Yoshihiro Uchida, Akishima (JP)

(73) Assignee: Olympus Corporation, Tokyo (JP)

( * ) Notice: Subject to any disclaimer, the term of this patent is extended or adjusted under 35 U.S.C. 154(b) by 143 days.

(21) Appl. No.: 13/199,018

(22) Filed: Aug. 16, 2011

(65) Prior Publication Data

US 2012/0057247 A1   Mar. 8, 2012

Related U.S. Application Data

(63) Continuation-in-part of application No. PCT/JP2010/052082, filed on Feb. 12, 2010.

(30) Foreign Application Priority Data

Feb. 17, 2009 (JP) .................................. 2009-033369

(51) Int. Cl.
*G02B 15/14* (2006.01)

(52) U.S. Cl.
USPC ............................. 359/686; 359/680; 359/676

(58) Field of Classification Search
USPC .......................... 359/676, 680–682, 684, 686
See application file for complete search history.

(56) References Cited

U.S. PATENT DOCUMENTS

| | | | | |
|---|---|---|---|---|
| 5,270,865 A | * | 12/1993 | Kikuchi et al. | 359/686 |
| 2009/0303611 A1 | | 12/2009 | Fujisaki et al. | |
| 2009/0310227 A1 | * | 12/2009 | Ueda | 359/686 |

FOREIGN PATENT DOCUMENTS

| | | |
|---|---|---|
| JP | 02-043512 | 2/1990 |
| JP | 05-100165 | 4/1993 |
| JP | 2006-039063 | 2/2006 |
| JP | 2007-286548 | 11/2007 |
| JP | 2008-170577 | 7/2008 |

* cited by examiner

*Primary Examiner* — James Greece
(74) *Attorney, Agent, or Firm* — Kenyon & Kenyon LLP

(57) ABSTRACT

A zoom lens system according to the present invention includes a first lens group with negative refractive power, a second lens group with positive refractive power, a third lens group with positive refractive power, and a fourth lens group with negative refractive power which are arranged in turn from the object side toward the image side, and the zoom lens system is formed so that, in performing a zooming operation from the wide angle end position to the telephoto end position, the first lens group keeps still, the distance between the first and second lens groups becomes small, the distance between the second and third lens groups becomes wide, and the distance between the third and fourth lens groups becomes small.

11 Claims, 20 Drawing Sheets

SPHERICAL ABERRATION
FNO. 3.647

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

SPHERICAL ABERRATION
FNO. 4.050

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

SPHERICAL ABERRATION
FNO. 5.365

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

435.84 ----    486.13 — - —    656.27 --------    587.56 ———

SPHERICAL ABERRATION
FNO. 3.676

-0.20    0.20
         (mm)

ASTIGMATISM
FIY 2.99

-0.20    0.20
         (mm)

DISTORTION
FIY 2.99

-5.00    5.00
         (%)

CHROMATIC ABERRATION OF MAGNIFICATION
FIY 2.99

-0.02    0.02
         (mm)

SPHERICAL ABERRATION
FNO. 4.024

-0.20    0.20
         (mm)

ASTIGMATISM
FIY 2.99

-0.20    0.20
         (mm)

DISTORTION
FIY 2.99

-5.00    5.00
         (%)

CHROMATIC ABERRATION OF MAGNIFICATION
FIY 2.99

-0.02    0.02
         (mm)

SPHERICAL ABERRATION
FNO. 5.166

-0.20    0.20
         (mm)

ASTIGMATISM
FIY 2.99

-0.20    0.20
         (mm)

DISTORTION
FIY 2.99

-5.00    5.00
         (%)

CHROMATIC ABERRATION OF MAGNIFICATION
FIY 2.99

-0.02    0.02
         (mm)

435.84 — — — —    486.13 — — — —    656.27 ---------    587.56 ————

SPHERICAL ABERRATION
FNO. 3.771

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

SPHERICAL ABERRATION
FNO. 4.092

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

SPHERICAL ABERRATION
FNO. 5.174

-0.20  0.20
(mm)

ASTIGMATISM
FIY 2.99

-0.20  0.20
(mm)

DISTORTION
FIY 2.99

-5.00  5.00
(%)

CHROMATIC ABERRATION OF MAGNIFICATION
FIY 2.99

-0.02  0.02
(mm)

435.84 ----- 486.13 —-— 656.27 --------- 587.56 ———

FIG.8A | FIG.8B | FIG.8C | FIG.8D
SPHERICAL ABERRATION FNO. 3.382 | ASTIGMATISM FIY 2.99 | DISTORTION FIY 2.99 | CHROMATIC ABERRATION OF MAGNIFICATION FIY 2.99

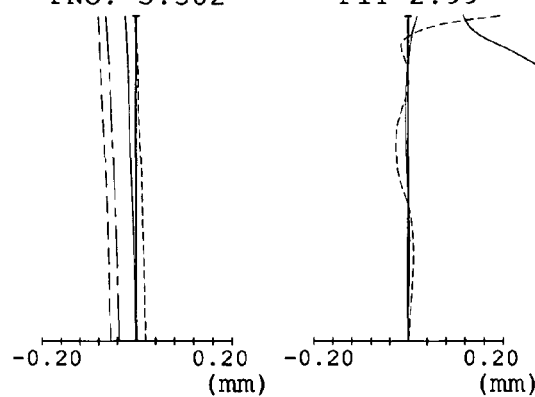
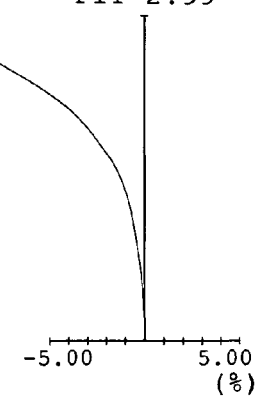
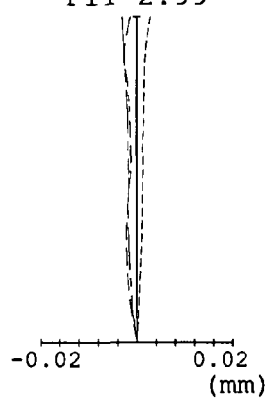

FIG.8E | FIG.8F | FIG.8G | FIG.8H
SPHERICAL ABERRATION FNO. 3.781 | ASTIGMATISM FIY 2.99 | DISTORTION FIY 2.99 | CHROMATIC ABERRATION OF MAGNIFICATION FIY 2.99

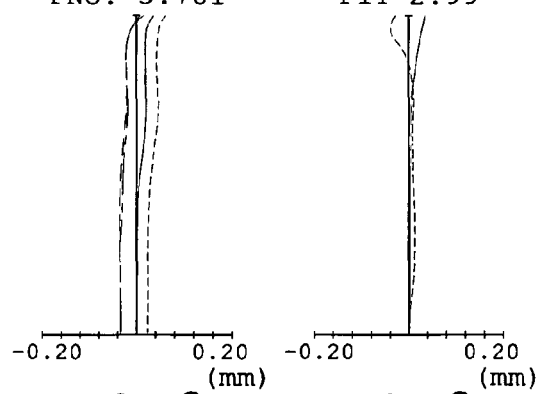
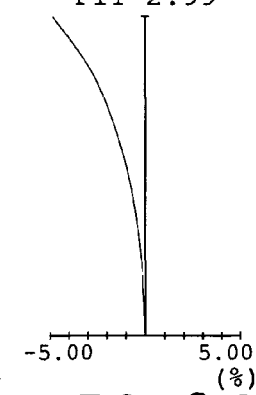
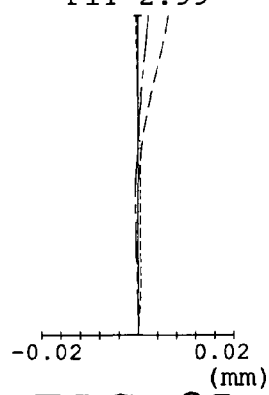

FIG.8I | FIG.8J | FIG.8K | FIG.8L
SPHERICAL ABERRATION FNO. 5.168 | ASTIGMATISM FIY 2.99 | DISTORTION FIY 2.99 | CHROMATIC ABERRATION OF MAGNIFICATION FIY 2.99

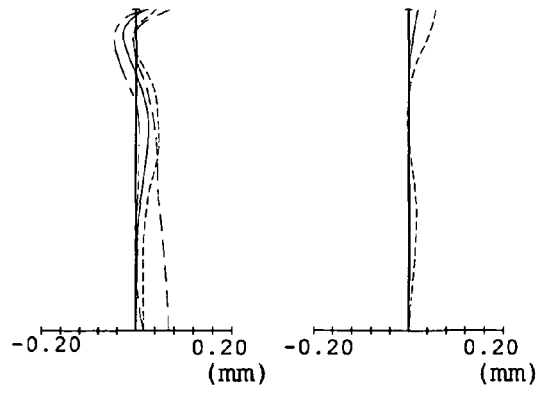
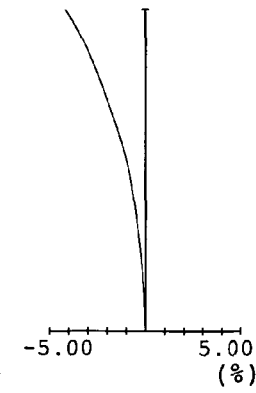
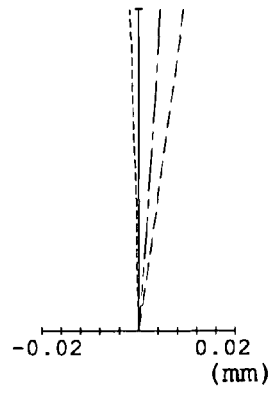

435.84 — — — —   486.13 — - —   656.27 - - - - - -   587.56 ————

SPHERICAL
ABERRATION
FNO. 3.250

-0.20  0.20
(mm)

ASTIGMATISM
FIY 2.99

-0.20  0.20
(mm)

DISTORTION
FIY 2.99

-5.00  5.00
(%)

CHROMATIC
ABERRATION OF
MAGNIFICATION
FIY 2.99

-0.02  0.02
(mm)

SPHERICAL
ABERRATION
FNO. 3.661

-0.20  0.20
(mm)

ASTIGMATISM
FIY 2.99

-0.20  0.20
(mm)

DISTORTION
FIY 2.99

-5.00  5.00
(%)

CHROMATIC
ABERRATION OF
MAGNIFICATION
FIY 2.99

-0.02  0.02
(mm)

SPHERICAL
ABERRATION
FNO. 5.067

-0.20  0.20
(mm)

ASTIGMATISM
FIY 2.99

-0.20  0.20
(mm)

DISTORTION
FIY 2.99

-5.00  5.00
(%)

CHROMATIC
ABERRATION OF
MAGNIFICATION
FIY 2.99

-0.02  0.02
(mm)

435.84 ----   486.13 — - —   656.27 --------   587.56 ———

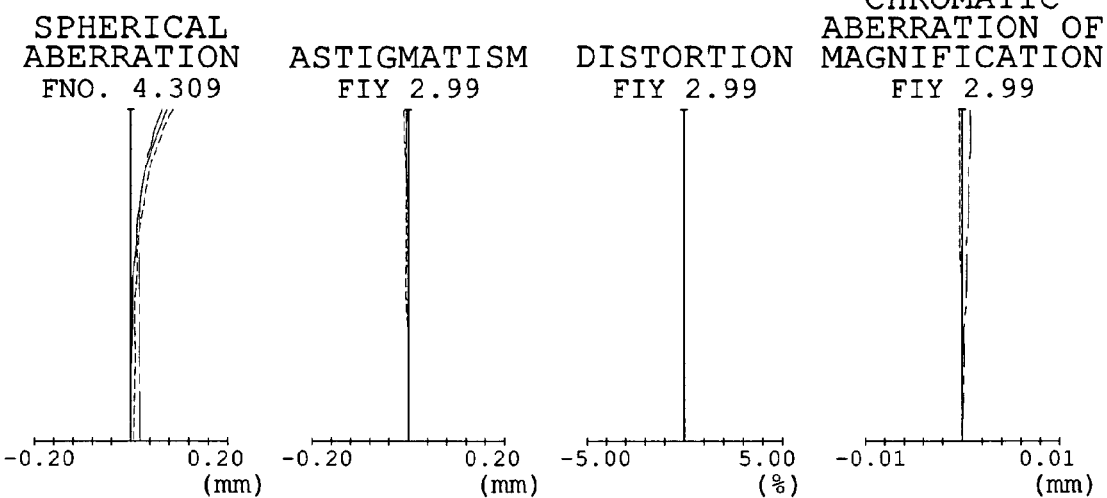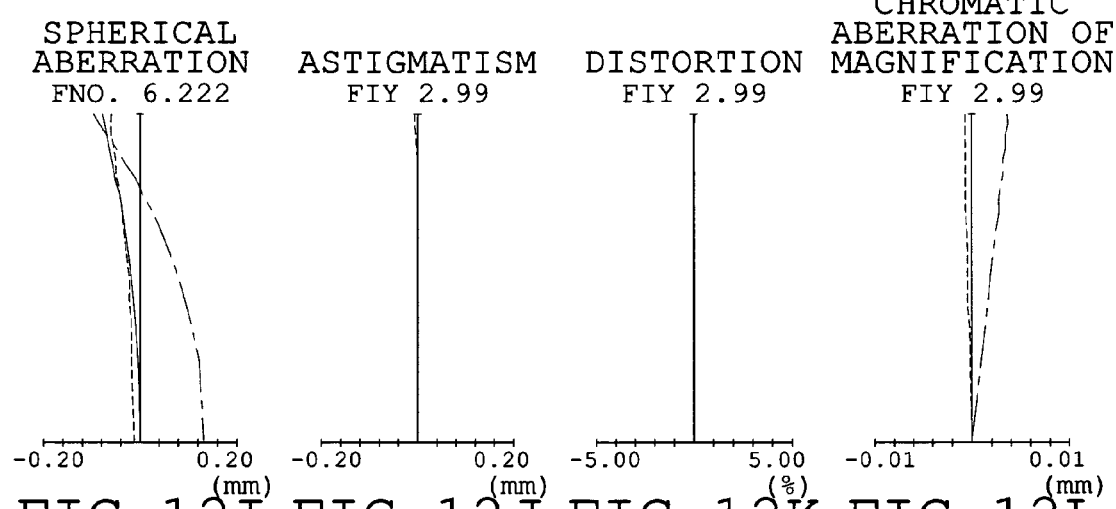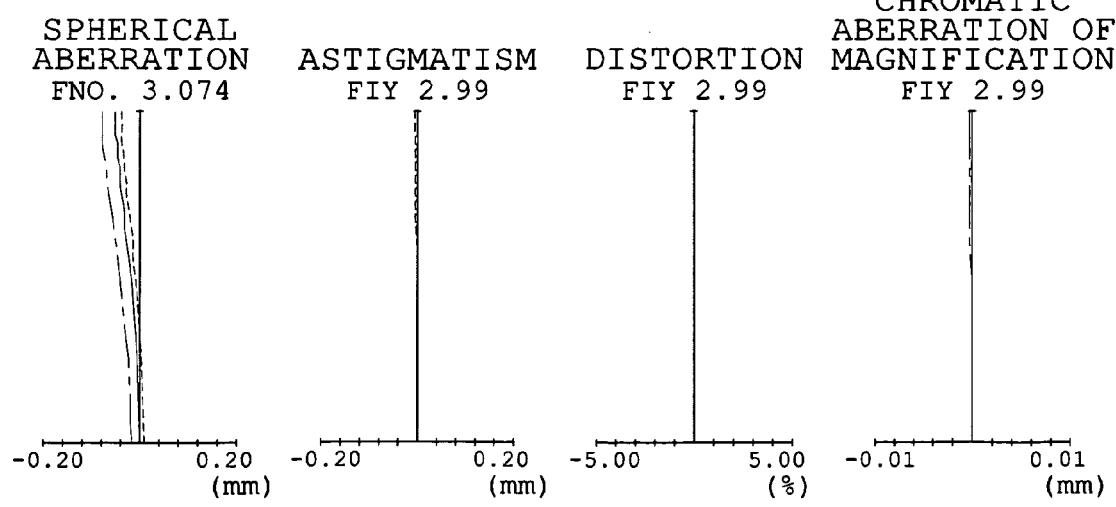

FIG.14A SPHERICAL ABERRATION FNO. 5.072
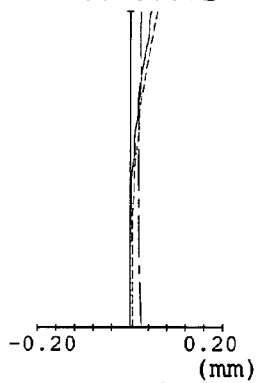

FIG.14B ASTIGMATISM FIY 2.99
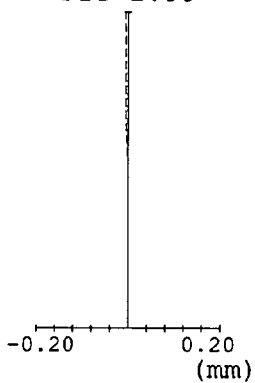

FIG.14C DISTORTION FIY 2.99
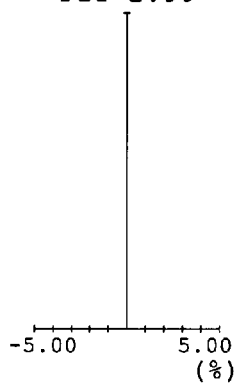

FIG.14D CHROMATIC ABERRATION OF MAGNIFICATION FIY 2.99
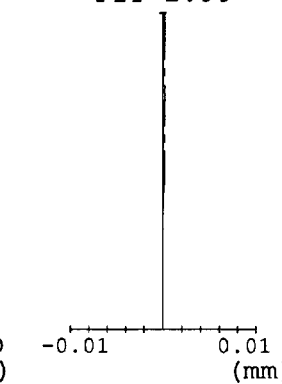

FIG.14E SPHERICAL ABERRATION FNO. 7.069
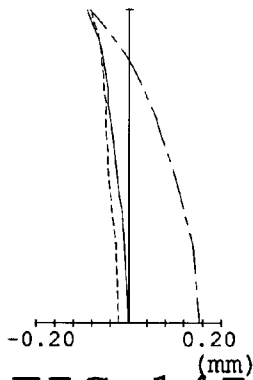

FIG.14F ASTIGMATISM FIY 2.99
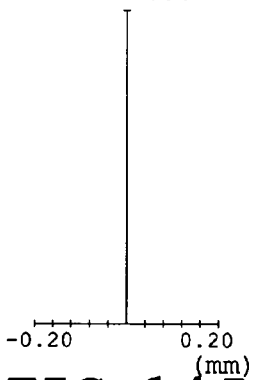

FIG.14G DISTORTION FIY 2.99
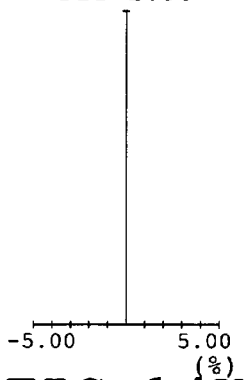

FIG.14H CHROMATIC ABERRATION OF MAGNIFICATION FIY 2.99
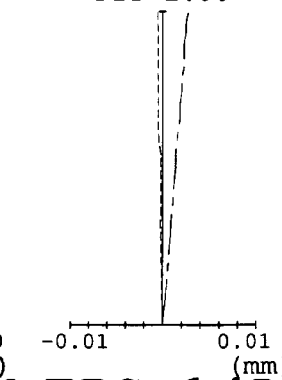

FIG.14I SPHERICAL ABERRATION FNO. 3.519
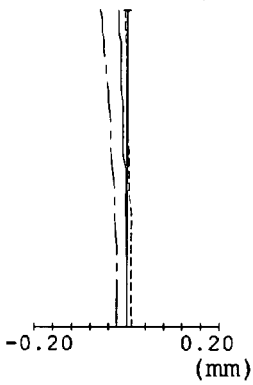

FIG.14J ASTIGMATISM FIY 2.99

FIG.14K DISTORTION FIY 2.99

FIG.14L CHROMATIC ABERRATION OF MAGNIFICATION FIY 2.99

435.84 — - —    656.27 - - - - - -    587.56 ———

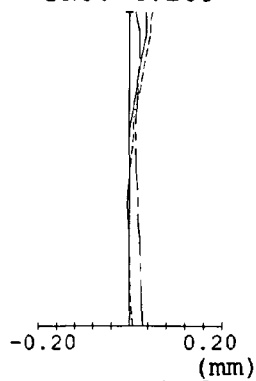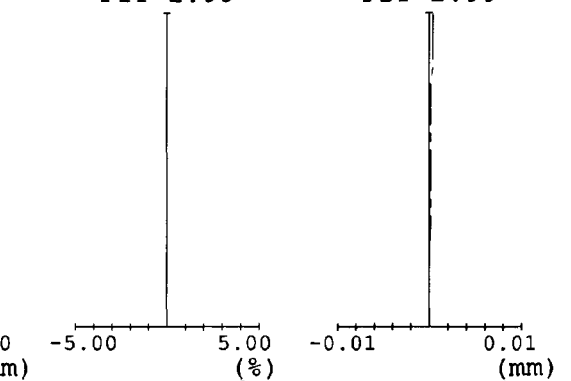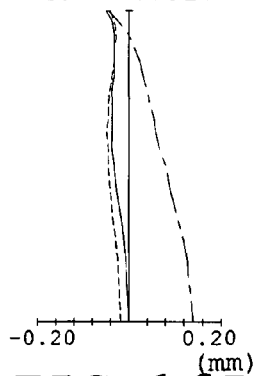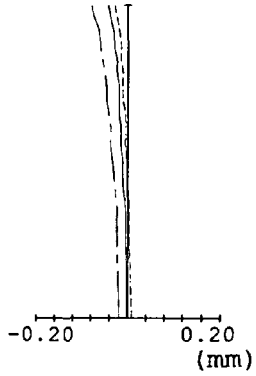

FIG.16A SPHERICAL ABERRATION FNO. 4.289
FIG.16B ASTIGMATISM FIY 2.99
FIG.16C DISTORTION FIY 2.99
FIG.16D CHROMATIC ABERRATION OF MAGNIFICATION FIY 2.99

FIG.16E SPHERICAL ABERRATION FNO. 6.017
FIG.16F ASTIGMATISM FIY 2.99
FIG.16G DISTORTION FIY 2.99
FIG.16H CHROMATIC ABERRATION OF MAGNIFICATION FIY 2.99

FIG.16I SPHERICAL ABERRATION FNO. 2.891
FIG.16J ASTIGMATISM FIY 2.99
FIG.16K DISTORTION FIY 2.99
FIG.16L CHROMATIC ABERRATION OF MAGNIFICATION FIY 2.99

435.84 — · — 656.27 --------- 587.56 ———

FIG.18A SPHERICAL ABERRATION FNO. 4.289
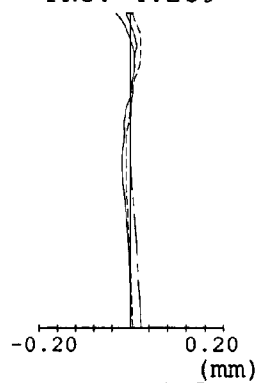

FIG.18B ASTIGMATISM FIY 2.99
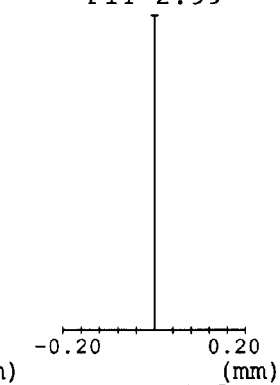

FIG.18C DISTORTION FIY 2.99
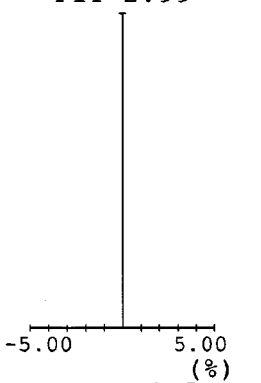

FIG.18D CHROMATIC ABERRATION OF MAGNIFICATION FIY 2.99
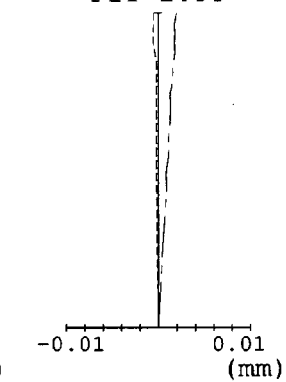

FIG.18E SPHERICAL ABERRATION FNO. 6.017
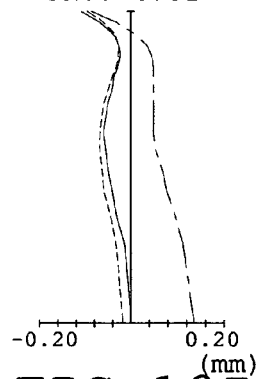

FIG.18F ASTIGMATISM FIY 2.99
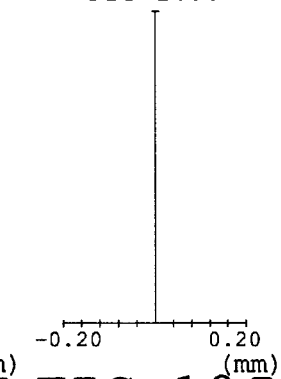

FIG.18G DISTORTION FIY 2.99
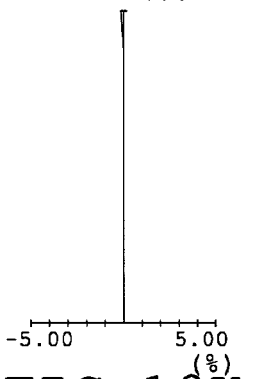

FIG.18H CHROMATIC ABERRATION OF MAGNIFICATION FIY 2.99
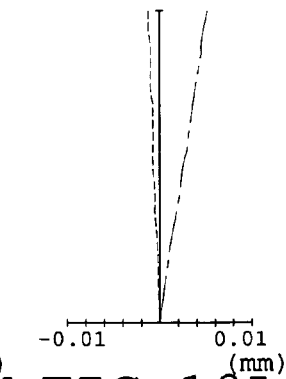

FIG.18I SPHERICAL ABERRATION FNO. 2.891
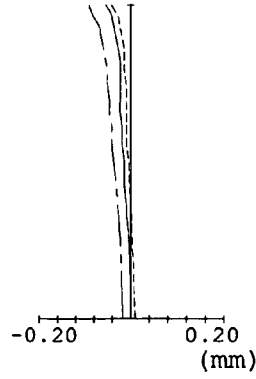

FIG.18J ASTIGMATISM FIY 2.99
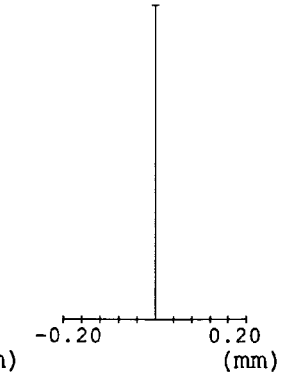

FIG.18K DISTORTION FIY 2.99
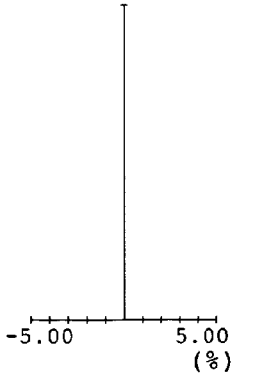

FIG.18L CHROMATIC ABERRATION OF MAGNIFICATION FIY 2.99
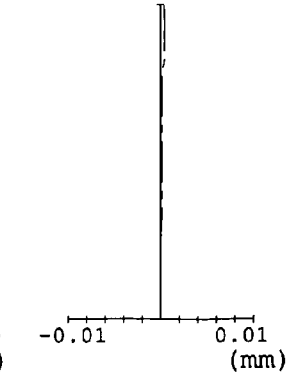

435.84 —--—   656.27 --------   587.56 ———

ZOOM LENS SYSTEM AND IMAGE PICKUP DEVICE HAVING THE SAME

This application claims benefits of Japanese Application No. 2009-033369 filed in Japan on Feb. 17, 2009, the contents of which are hereby incorporated by reference.

BACKGROUND OF THE INVENTION

1. Field of the Invention

This invention relates to a zoom lens system and an image pick up device having the same.

2. Description of the Related Art

Digital cameras, which are provided with a solid-state image sensor like CCD (Charge Coupled Device) or CMOS (Complementary Metal-Oxide Semiconductor), have become mainstream instead of film-based cameras in recent years. These digital cameras include various kinds of digital cameras which range from high performance-type digital camera for business to compact popular-type digital camera.

And, in such digital cameras, compact popular-type digital cameras have improved in downsizing because of desires that users easily enjoy photography, so that digital cameras which can be put well in pockets of clothes or bags and are convenient to be carried have appeared. Such small digital cameras can be stored in any space and used in any place, so that sturdiness and dust resistance also have become important factors for such small digital cameras.

Accordingly, it has become necessary to downsize zoom lens system for such digital cameras yet more, and, in addition, sturdiness and dust resistance have become necessary for the zoom lens system.

Zoom lens system which meet such requirements include a zoom lens which is disclosed in Japanese Patent Kokai No. 2007-286548. The zoom lens which is disclosed in Japanese Patent Kokai No. 2007-286548 is composed of a first lens group with negative refractive power, a second lens group with positive refractive power, a third lens group with positive power, and a fourth lens group. In this case, the first lens group always keeps still in changing a magnification. That is to say, the distance between the first lens group and the image plane does not change.

SUMMARY OF THE INVENTION

A zoom lens system according to the present invention is characterized in that: the zoom lens system includes, in order from the object side, a first lens group with negative refractive power, a second lens group with positive refractive power, a third lens group with positive refractive power, and a fourth lens group with negative refractive power; and, in performing a zooming operation from the wide angle end position to the telephoto end position, the first lens group keeps still, the distance between the first and second lens groups becomes small, the distance between the second and third lens groups becomes wide, and the distance between the third and fourth lens groups becomes small.

Also, in a zoom lens system according to the present invention, it is preferred that: the first lens group is a cemented lens which is formed by joining a first lens element L11 and a second lens element L12 that are arranged in that order from the object side; and the first lens element L11 and the second lens element L12 satisfy the following condition (1):

$$70 < v_{deff} < 350 \quad (1)$$

where $v_{deff}=1/[f_r \cdot (\phi 1/vf1+\phi 2/vf2)]$, vf1 denotes the Abbe's number of the first lens element L11, vf2 denotes the Abbe's number of the second lens element L12, $f_r$ denotes the focal length of the cemented lens, $\phi 1=1/f1$ (where f1 denotes the focal length of the first lens element L11), $\phi 2=1/f2$ (where f2 denotes the focal length of the second lens element L12), and the Abbe's numbers are (nd−1)/(nf−nC).

Also, in a zoom lens system according to the present invention, it is preferred that the shape of the border surface between the first lens element L11 and the second lens element L12 is a shape of aspherical surface.

Also, in a zoom lens system according to the present invention, it is preferred that the cemented lens which is composed of the first lens element L11 and the second lens element L12 satisfies the following condition (2):

$$90 < v_{deff} < 350 \quad (2)$$

Also, in a zoom lens system according to the present invention, it is preferred that: an aperture stop is arranged between the first lens group and the third lens group; and the aperture diameter of the aperture stop in the telephoto end position becomes larger than the aperture diameter of the aperture stop in the wide angle end position.

Also, in a zoom lens system according to the present invention, it is preferred that: at least one of the lens groups which are located nearer to the image side than the aperture stop is a cemented lens which is composed of two lens elements of a first lens element Lb1 and a second lens element Lb2 that are arranged in that order from the object side; and the first lens element Lb1 and the second lens element Lb2 satisfy the following condition (3):

$$10 < \Delta v < 70 \quad (3)$$

where $\Delta v=||vb1−vb2|$, vb1 denotes the Abbe's number of the first lens element Lb1, and vb2 denotes the Abbe's number of the second lens element Lb2.

Also, in a zoom lens system according to the present invention, it is preferred that the refractive indices of all of glass materials for the lens elements constituting optical system satisfy the following condition (4):

$$1.45 < nd < 1.65 \quad (4)$$

where nd denotes refractive index with respect to the d line.

Also, in a zoom lens system according to the present invention, it is preferred that the shape on the nearest side to the image side in the third lens group is a convex shape that faces toward the image plane, and the air spacing between the third lens group and the fourth lens group satisfies the following condition (5) or (6):

when Rn<0.35

$$|dG3G4(Rn)/f1(w)−0.37|<0.0030 \quad (5)$$

when Rn=0.35 or Rn=0.5

$$|dG3G4(Rn=0.5)/f1(w)−dG3G4(Rn=0.35)/f1(w)| > 0.004 \quad (6)$$

where dG3G4(Rn=0.5) denotes the air spacing between the third lens group and fourth lens group in the case where Rn=0.5, dG3G4(Rn=0.35) denotes the air spacing between the third lens group and fourth lens group in the case where Rn=0.35, and Rn=|RG3/f1(w)| (that is to say, Rn is obtained by normalizing a distance RG3 from optical axis at the nearest surface to the image plane in the third lens group by the focal length f1(w) in the wide angle end position).

Also, in a zoom lens system according to the present invention, it is preferred that the first lens group includes a negative lens, a reflection optical element for bending optical paths, and a positive lens, in that order from the object side toward the image side, and the following conditions (7) and (8) are satisfied:

$$0.5 < (R11+R12)/(R11-R12) < 4.2 \quad (7)$$

$$16 < v1-v2 < 54 \quad (8)$$

where R11 denotes the radius of curvature of the object-side surface of the negative lens, R12 denotes the radius of curvature of the image-side surface of the negative lens, v1 denotes the Abbe's number of the negative lens, and v2 denotes the Abbe's number of the positive lens.

Also, in a zoom lens system according to the present invention, it is preferred that the following condition (9) is satisfied:

$$-2.5 < f1/\sqrt{(fw \cdot ft)} < -0.5 \quad (9)$$

where f1 denotes the focal length of the first lens group, and fw and ft denote the focal lengths of the whole optical system in the wide angle end position and in the telephoto end position, respectively.

Also, in a zoom lens system according to the present invention, it is preferred that the following condition (10) is satisfied:

$$1.0 < EX\_Tele/EX\_Wide < 4.3 \quad (10)$$

where EX_Wide denotes the distance from the image plane to the exit pupil in the wide angle end position, and EX_Tele denotes the distance form the image plane to the exit pupi in the telephoto end position.

Also, an image pickup device having a zoom lens system according to the present invention is characterized in that the image pick up device is provided with a zoom lens according to the present invention and an electronic image sensor.

The present invention is capable of offering: a zoom lens system which has good optical properties and is small, excellent in cost performance, and compact; and an image pick up device having the same.

These and other features and advantages of the present invention will become apparent from the following detailed description of the preferred embodiments when taken in conjunction with the accompanying drawings.

BRIEF DESCRIPTION OF THE DRAWINGS

FIG. 2 are aberration diagrams in the embodiment 1.

FIG. 4 are aberration diagrams in the embodiment 2.

FIG. 6 are aberration diagrams in the embodiment 3.

FIG. 8 are aberration diagrams in the embodiment 4, FIGS. 8A, 8B, 8C, and 8D show aberrations in the wide angle end position, FIGS. 8E, 8F, 8G, and 8H show aberrations in the middle position, and FIGS. 8I, 8J, 8K, and 8L show aberrations in the telephoto end position.

FIG. 10 are aberration diagrams in the embodiment 5.

FIG. 12 are aberration diagrams in the embodiment 6, FIGS. 12A, 12B, 12C, and 12D show aberrations in the wide angle end position, FIGS. 12E, 12F, 12G, and 12H show aberrations in the middle position, and FIGS. 12I, 12J, 12K, and 12L show aberrations in the telephoto end position.

FIG. 14 are aberration diagrams in the embodiment 7, FIGS. 14A, 14B, 14C, and 14D show aberrations in the wide angle end position, FIGS. 14E, 14F, 14G, and 14H show aberrations in the middle position, and FIGS. 14I, 14J, 14K, and 14L show aberrations in the telephoto end position.

FIG. 16 are aberration diagrams in the embodiment 8, FIGS. 16A, 16B, 16C, and 16D show aberrations in the wide angle end position, FIGS. 16E, 16F, 16G, and 1611 show aberrations in the middle position, and FIGS. 16I, 16J, 16K, and 16L show aberrations in the telephoto end position.

FIG. 18 are aberration diagrams in the embodiment 9, FIGS. 18A, 18B, 18C, and 18D show aberrations in the wide angle end position, FIGS. 18E, 18F, 18G, and 18H show aberrations in the middle position, and FIGS. 18I, 18J, 18K, and 18L show aberrations in the telephoto end position.

DETAILED DESCRIPTION OF THE PREFERRED EMBODIMENTS

Figure 1A:
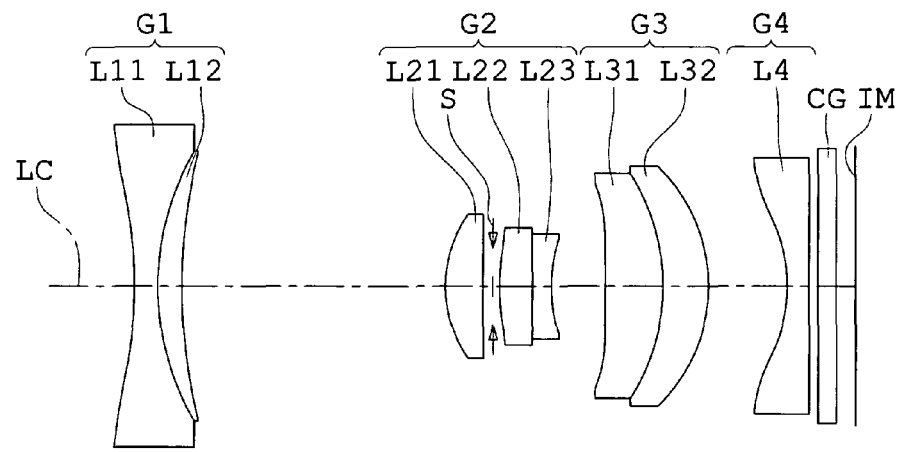
FIG. 1 is a sectional view showing an embodiment 1 of zoom lens system according to the present invention, developed along the optical axis.

Prior to the description of embodiments of zoom lens system according to the present invention, operation effects in zoom lens system in the present embodiments will be explained.

The zoom lens system in the present embodiments include, in order from the object side toward the image plane side, a first lens group with negative refractive power, a second lens group with positive refractive power, a third lens group with positive refractive power, and a fourth lens group with negative refractive power, and, in performing a zooming operation from the wide angle end position to the telephoto end position, the first lens group keeps still, the distance between the first and second lens groups becomes small, the distance between the second and third lens groups becomes wide, and the distance between the third and fourth lens groups becomes small.

In a zoom lens system in the present embodiments, the two lens groups of the second and fourth lens groups are made to have variable magnification function. As a result, the moving amount of each of the lens groups is reduced. In addition, the position of the image plane is corrected by the third lens group in performing a zooming operation, so that the sufficient moving amount of each of the lens groups is secured.

And, in a zoom lens system in the present embodiments, the first lens group is made to always keep still in performing a zooming operation (the distance between the first lens group and the image plane does not change), so that the first lens group can be fixed to camera body. As a result, it is possible to improve sturdiness and dust resistance, as compared with the case where the first lens group moves relative to the camera body.

In a zoom lens system in the present embodiments, the first lens group is preferably a cemented lens which is composed of two lens elements of a first lens element L11 and a second lens element L12 that are arranged in that order from the object side toward the image side, and it is preferred that the first lens element L11 and the second lens element L12 satisfy the following condition (1):

$$70 < v_{deff} < 350 \quad (1)$$

where $v_{deff} = 1/[f_t(\phi1/vf1 + \phi2/vf2)]$, vf1 denotes the Abbe's number of the first lens element L11, vf2 denotes the Abbe's number of the second lens element L12, $f_t$ denotes the focal length of the cemented lens, $\phi1 = 1/f1$ (where f1 denotes the focal length of the first lens element L11), $\phi2 = 1/f2$ (where f2 denotes the focal length of the second lens element L12), and the Abbe's numbers are (nd−1)/(nf−nC).

When zoom lens system is downsized without changing the total length of the zoom lens system, it becomes hard to correct chromatic aberration occurring in the first lens group in the whole zooming range of a zooming operation with the second lens group and the lens groups following the second lens group. Accordingly, the first lens group is formed in such a way that the first lens group satisfies the above described condition (1). As a result, it is possible to decrease the occurrence of chromatic aberration in the first lens group without making the total length of the zoom lens system long. The condition (1) prescribes: the difference between the Abbe's numbers in the first lens group; and power allocation in the first lens group. If the value of $v_{deff}$ is below the lower limit of the condition (1), the correction of chromatic aberration becomes insufficient, which is unfavorable. If the value of $v_{deff}$ is beyond the upper limit of the condition (1), the correction of chromatic aberration becomes surplus one and the optical performances deteriorate, which is unfavorable.

Also, in a zoom lens in the present embodiments, it is preferred that the shape of the border surface between the first lens element L11 and the second lens element L12 is a shape of aspherical surface.

When the refractive index of the cemented bordering surface in the area in the vicinity of the optical axis is made to differ from that of the cemented border surface in the peripheral area, it is possible to correct both axial chromatic aberration and chromatic aberration of magnification, well.

Also, in a zoom lens system in the present embodiments, it is preferred that the cemented lens which is composed of the first lens element L11 and the second lens element L12 satisfies the following condition (2):

$$90 < v_{deff} < 350 \quad (2)$$

It is possible to correct chromatic aberration of magnification in high image height more effectively, by the cemented lens satisfying the above described condition (2). Also, when the cemented lens which is composed of the first lens element L11 and the second lens element L12 satisfies the following condition (2'), it is possible to correct the aberration better:

$$160 < v_{deff} < 350 \quad (2')$$

Also, in a zoom lens system in the present embodiments, it is preferred that: an aperture stop is arranged between the first lens group and the third lens group; and the aperture diameter of the aperture stop in the telephoto end position becomes larger than the aperture diameter of the aperture stop in the wide angle end position.

When an attempt to secure a sufficient variable magnification ratio is made in a negative-lead type optical system (that is to say, an optical system the first lens group of which has negative refractive power), the variation in Fno becomes large. Accordingly, when the optical system is provided with an aperture stop in the above described manner, it is possible to make Fno in the telephoto end position have a value at which a sufficient amount of light can be secured, or to make Fno in the telephoto end position have a value at which diffraction does not affect the optical system. In addition, there is no necessity that Fno in the wide angle end position is made to have a bright value beyond necessity, so that it is possible to prevent deterioration of image quality due to aberration.

Also, in a zoom lens system in the present embodiments, it is preferred that: at least one of the lens groups which are located nearer to the image side than the aperture stop is a cemented lens which is composed of two lens elements of a first lens element Lb1 and a second lens element Lb2 that are arranged in that order from the object side; and the first lens element Lb1 and the second lens element Lb2 satisfy the following condition (3):

$$10 < \Delta v < 70 \quad (3)$$

where Δv=|vb1−b2|, vb1 denotes the Abbe's number of the first lens element Lb1, and vb2 denotes the Abbe's number of the second lens element Lb2.

When the cemented lens is arranged on the image side of the stop, it is particularly possible to correct chromatic aberration of magnification in the whole of the lens system that is located nearer to the image side than the second lens group, better. The above described condition (3) specifies a condition which glass materials for the cemented lens have to satisfy. If the value of Δv is beyond the upper limit of the condition (3), the correction becomes surplus one. If the value of Δv is below the lower limit of the condition (3), the correction becomes insufficient, which are unfavorable.

Also, when the first lens element Lb1 and the second lens element Lb2 satisfy the following condition (3'), better correction can be made:

$$30 < \Delta v < 50 \quad (3')$$

Also, in a zoom lens system in the present embodiments, it is preferred that the refractive indices of all of glass materials for the lens elements constituting optical system satisfy the following condition (4):

$$1.45 < nd < 1.65 \quad (4)$$

where nd denotes refractive index with respect to the d line.

In order to secure good performances of optical system in downsizing the optical system, tolerance of the middle thickness of lens becomes very strict. Above all, aberrations such as field curvature and spherical aberration widely vary in accordance with the variation in the middle thickness of lens. Accordingly, there is necessity of making lenses accurately in downsizing optical system. In order to make lenses accurately, it is desired that the lenses are made by molding. Accordingly, when glass materials which are used for the lenses satisfy the condition (4), it becomes easy to apply molded lens to the optical system. As a result, dimension accuracy of the middle thickness of lens can be improved, so that it is possible to reduce influences on field of curvature and spherical aberration.

Also, a problem in downsizing optical system is deterioration of its peripheral performances due to various aberrations. In order to reduce the deterioration, there is the necessity of using a strongly aspherical surface so that the shape of optical surface is made to vary large in the paraxial area and the peripheral area. In this case, it is preferred that the refractive indices of the glass materials themselves are lowered. As a result, a contribution to the refractive indices due to shape can be increased.

Accordingly, when grass materials which are used for the lenses satisfy the condition (4), the degree of freedom for the shape of lens increases, and it is possible to secure the peripheral performance of lens. If the value of nd is beyond the upper limit of the condition (4), it is impossible to secure the degree of freedom for the shape of lens in the peripheral area and the value of nd beyond the upper limit causes deterioration of the peripheral performance, which is unfavorable. If the value of nd is below the lower limit of the condition (4), the shape of aspherical surface becomes too strong due to insufficient refractive power, so that the value of nd below the lower limit causes deterioration of the peripheral performance, which is unfavorable.

Also, in a zoom lens system in the present embodiments, it is preferred that the shape of the nearest surface to the image side in the third lens group is a convex shape that faces toward the image plane, and the air spacing between the third lens group and the fourth lens group satisfies the following condition (5) or (6):

when Rn<0.35

$$|dG3G4(Rn)/f1(w)-0.37|<0.0030 \quad (5)$$

when Rn=0.35 or Rn=0.5

$$|dG3G4(Rn=0.5)/f1(w)-dG3G4(Rn=0.35)/f1(w)|>0.004 \quad (6)$$

where dG3G4(Rn=0.5) denotes the air spacing between the third lens group and fourth lens group in the case where Rn=0.5, dG3G4(Rn=0.35) denotes the air spacing between the third lens group and fourth lens group in the case where Rn=0.35, and Rn=|RG3/f1(w)| (that is to say, Rn is obtained by normalizing a distance RG3 from optical axis at the nearest surface to the image side in the third lens group by the focal length f1(w) in the wide angle end position).

In the case where the zoom lens system in the present embodiments are combined with an electronic image sensor, the shape of the space which is formed between the third and fourth lens groups has a great influence on an angle of incidence of off-axis light ray entering the sensor. The above described conditions (5) and (6) give a characteristic in which the both lens groups keep an approximately constant air spacing up to some height and the air spacing between the third and fourth lens groups enlarges widely at a height from the optical axis which exceeds the some height. As a result of this characteristic, the nearer a portion of the surface of the fourth lens group which light enters is to the peripheral area of the fourth lens group, the more the negative power at the portion lowers. As a result, peripheral light rays can be made to enter the sensor gently while filed of curvature in the optical system is being corrected well.

The above described condition (5) specifies the shape of the area relatively near to the optical axis. If the value of dG3G4(Rn)/f1(w)−0.37 is beyond the upper limit of the condition (5), it becomes hard to correct on-axis aberration in changing a magnification, which is unfavorable. Also, the above described condition (6) specifies the shape of the peripheral area. If the value of dG3G4(Rn=0.5)/f1(w)−dG3G4(Rn=0.35)/f1(w) is below the lower limit of the condition (6), the angles of incidence of peripheral light rays which enter the sensor become large, which is unfavorable.

Also, in a zoom lens system according to the present invention, it is preferred that the first lens group includes a negative lens, a reflection optical element for bending optical paths, and a positive lens, in that order from the object side toward the image side, and the following conditions (7) and (8) are satisfied:

$$0.5<(R11+R12)/(R11-R12)<4.2 \quad (7)$$

$$16<v1-v2<54 \quad (8)$$

where R11 denotes the radius of curvature of the object-side surface of the negative lens, R12 denotes the radius of curvature of the image-side surface of the negative lens, v1 denotes the Abbe's number of the negative lens, and v2 denotes the Abbe's number of the positive lens.

When a reflection optical element for bending optical paths is built in the first lens group, the total length of the optical system becomes long. In particular, when the zoom lens system is formed so that: the zoom lens system has a high magnification; becomes a wide angle lens; and has a large aperture diameter, it is noticeable that the total length of the optical system becomes long. In order to avoid this matter, a negative lens is arranged nearer to the object side than the reflection optical element in the zoom lens system of the present invention. In addition, in order to correct chromatic aberration of magnification which occurs due to the negative lens, at least one positive lens is arranged on the image plane side of the reflection optical element Also, the achievement of the condition (7) makes it possible to make a small zoom lens system and also makes it possible to restrain chromatic aberration of magnification. If the value in the condition (7) is beyond the upper limit of the condition (7), the radius of curvature of the image plane-side surface becomes too large, so that the reflection optical element inevitably has a large size. As a result, the total length inevitably becomes long. Also, if the value in the condition (7) is below the lower limit of the condition (7), the radius of curvature of the image plane-side surface becomes too small. As a result, it is inevitably noticeable that chromatic aberration of magnification occurs in the wide angle end position and chromatic aberration on the optical axis occurs in the telephoto end position.

Also, the achievement of the condition (8) makes it possible to correct chromatic aberration of magnification well. If the value in the condition (8) is beyond the upper limit of the condition (8), a correction of the aberration becomes insufficient one, which is unfavorable. Also, if the value in the condition (8) is below the lower limit of the condition (8), a correction of the aberration becomes surplus one.

Also, when the following conditions are satisfied, it is possible to make a better correction of the aberration:

$$0.8<(R11+R12)/(R11-R12)<2.7 \quad (7')$$

$$19<v1-v2<46 \quad (8')$$

Also, in a zoom lens system according to the present invention, it is preferred that the following condition (9) is satisfied:

$$-2.5 < f1/\sqrt{(fw \cdot ft)} < -0.5 \quad (9)$$

where f1 denotes the focal length of the first lens group, and fw and ft denote the focal lengths of the whole optical system in the wide angle end position and in the telephoto end position, respectively.

In this kind of zoom lens system, when a reflection optical element for bending optical paths is built in the first lens group, the total length of the optical system becomes long. In particular, when the zoom lens system is formed so that: the zoom lens system has a high magnification; becomes a wide angle lens; and has a large aperture diameter, it is noticeable that the total length of the optical system becomes long. In order to avoid this matter, the zoom lens system is formed so that the above described condition (9) is satisfied in the first lens group. That is to say, if the value in the condition (9) is below the lower limit of the condition (9), the negative power of the first lens becomes too small relative to zooming magnification, so that the reflection optical element has a large size. As a result, the total length of the optical system becomes long. Also, if the value in the condition (9) is beyond the upper limit of the condition (9), the power of the first lens becomes too large relative to zooming magnification. As a result, it is inevitably noticeable that chromatic aberration of magnification occurs in the wide angle end position and axial chromatic aberration occurs in the telephoto end position.

Also, in this case, when the following condition is satisfied, it is possible to make a better correction of the aberration:

$$-1.7 < f1/\sqrt{(fw \cdot ft)} < -0.8 \quad (9')$$

Also, in a zoom lens system according to the present invention, it is preferred that the following condition (10) is satisfied:

$$1.0 < EX\_Tele/EX\_Wide < 4.3 \quad (10)$$

where EX_Wide denotes the distance from the image plane to the exit pupil in the wide angle end position, and EX_Tele denotes the distance form the image plane to the exit pupil in the telephoto end position.

If the value in the condition (10) is below the lower limit of the condition (10), the exit pupil position inevitably becomes remote from the position of the image plane. As a result, it is impossible to downsize the optical system. Also, if the value in the condition (10) is beyond the upper limit of the condition (10), variations in angles of incidence of light rays that enter a sensor become large and matching between the sensor and a sensor micro lens deteriorates. As a result, an image inevitably becomes dark in the peripheral area.

Also, in this case, when the following condition is satisfied, it is possible to make a better correction:

$$1.0 < EX\_Tele/EX\_Wide < 4.4 \quad (10')$$

In addition, an image pickup device having a zoom lens system according to the present embodiments includes a zoom lens system according to the present embodiments and an electronic image sensor.

[Embodiment]

Figure 1B:
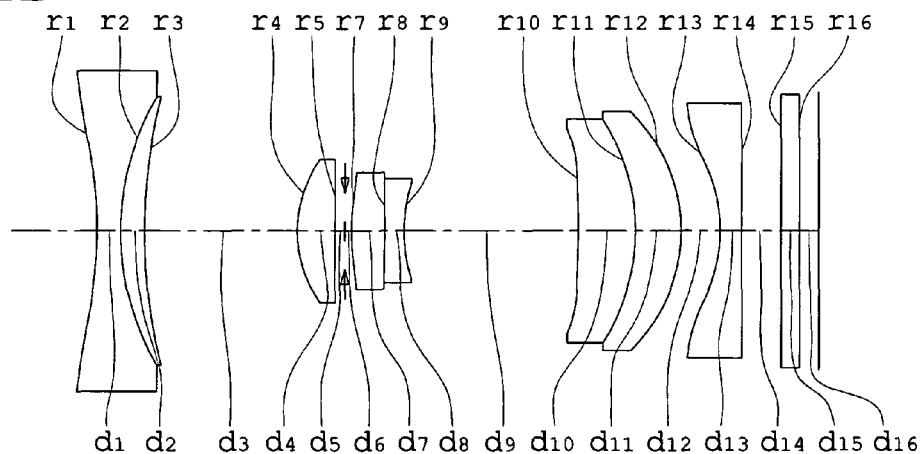
Figure 3A:
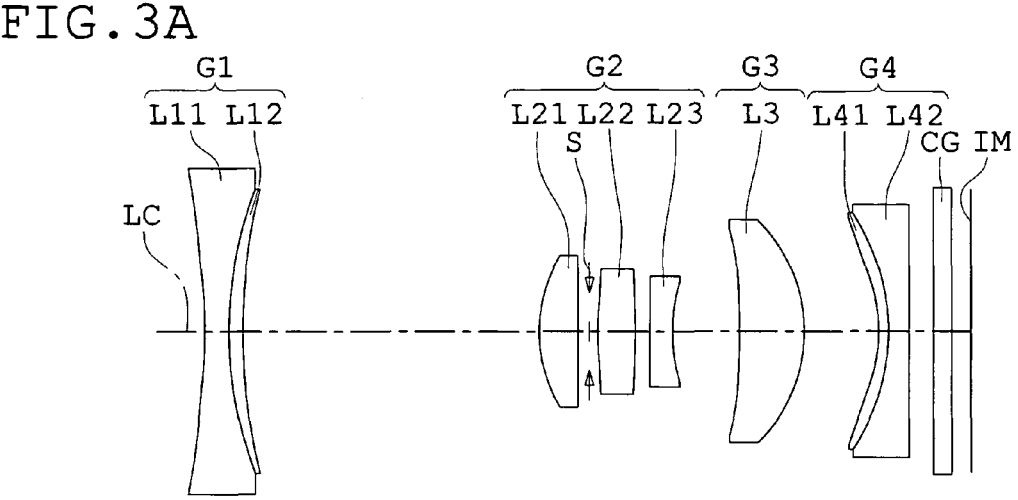
FIG. 3 is a sectional view showing an embodiment 2 of zoom lens system according to the present invention, developed along the optical axis.
Figure 3B:
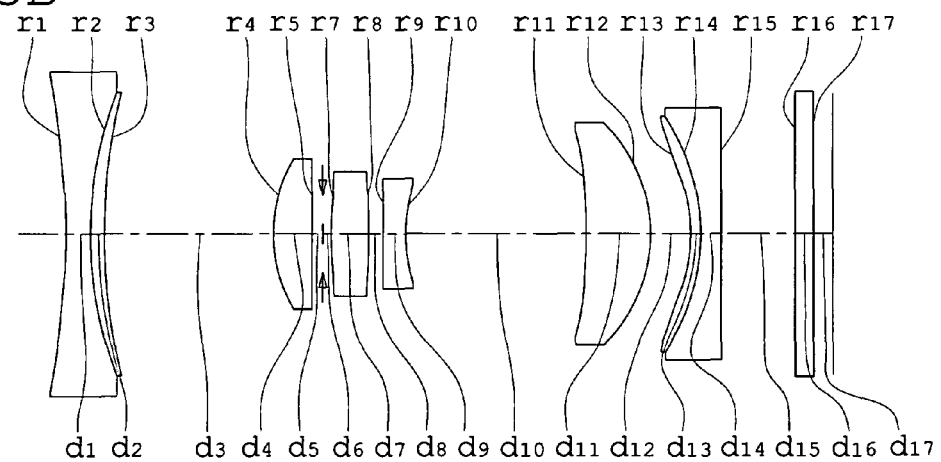
Figure 5A:
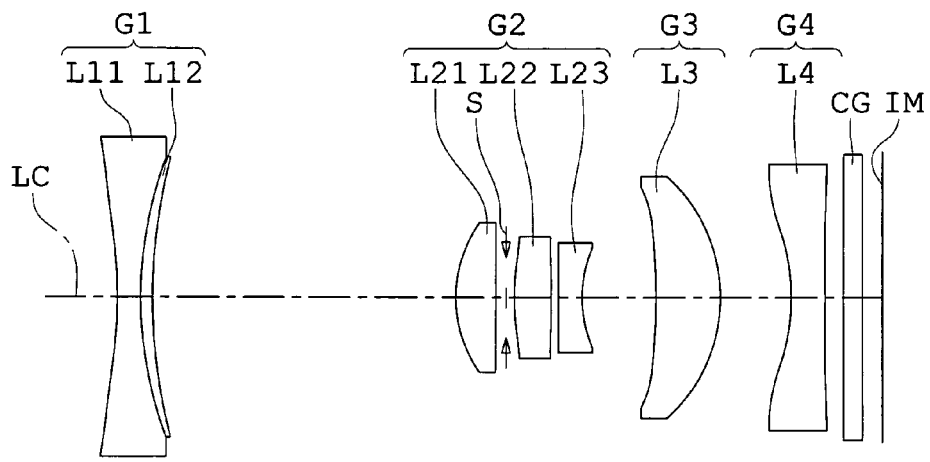
FIG. 5 is a sectional view showing an embodiment 3 of zoom lens system according to the present invention, developed along the optical axis.
Figure 5B:
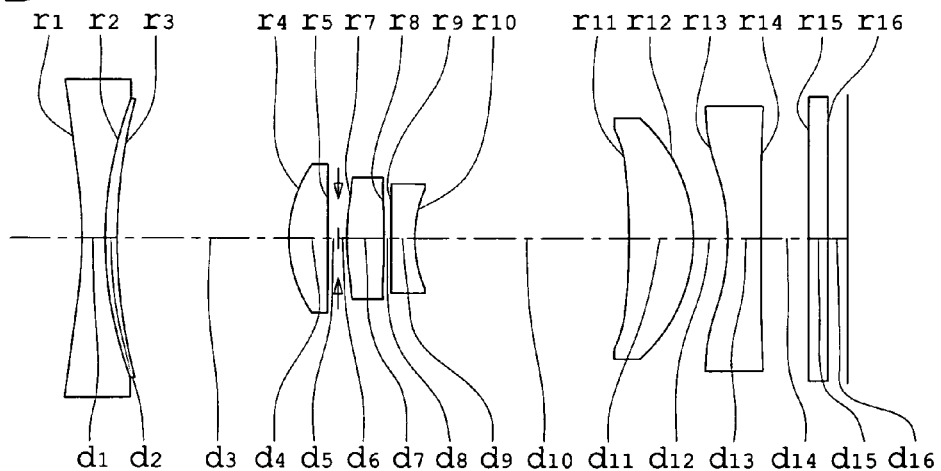
Figure 7A:
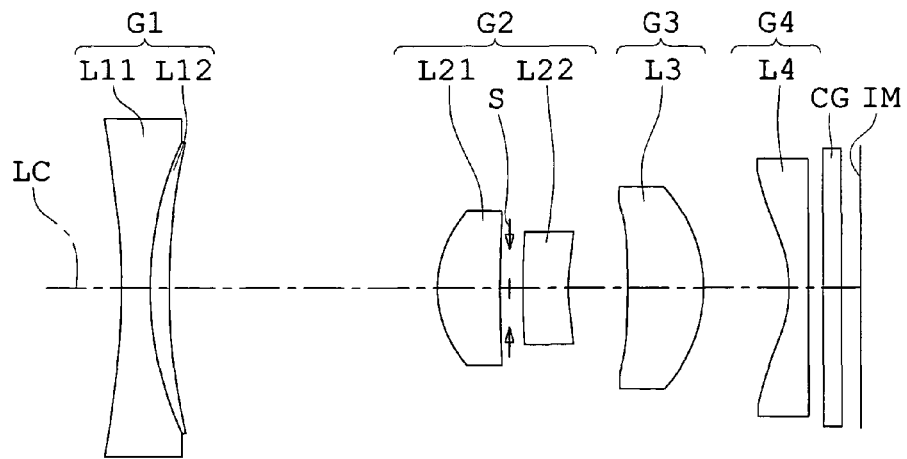
FIG. 7 is a sectional view showing an embodiment 4 of zoom lens system according to the present invention, developed along the optical axis.
Figure 7B:
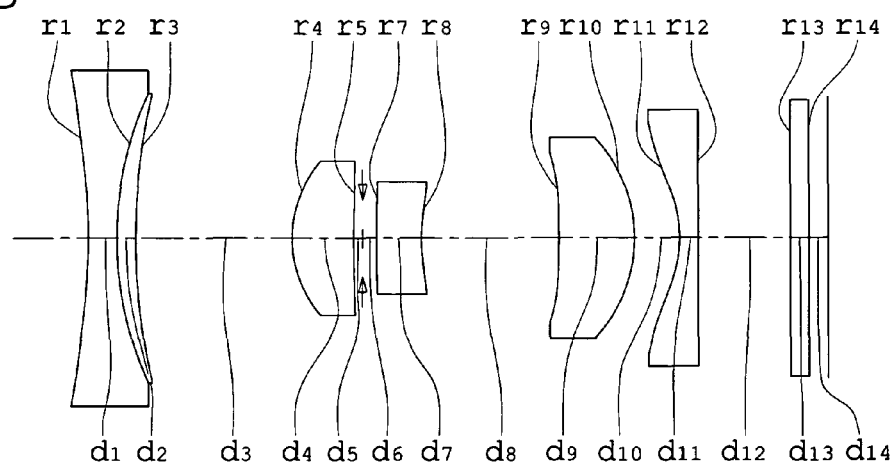
Figure 9A:
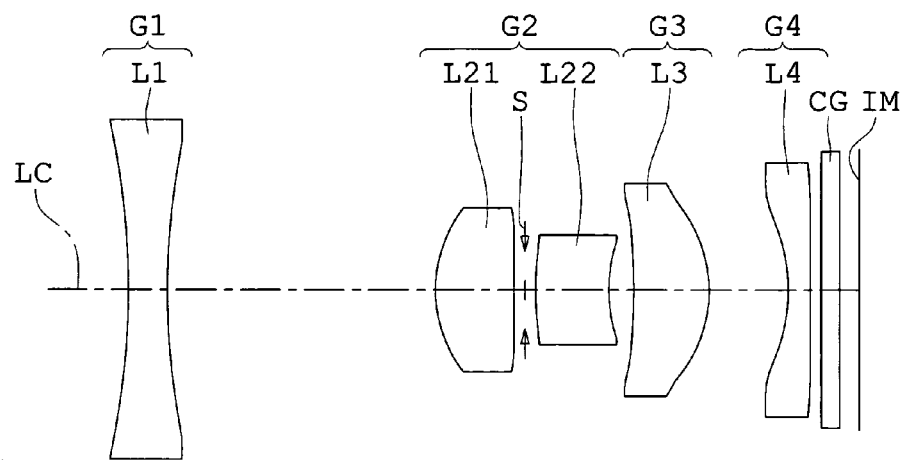
FIG. 9 is a sectional view showing an embodiment 5 of zoom lens system according to the present invention, developed along the optical axis.
Figure 9B:
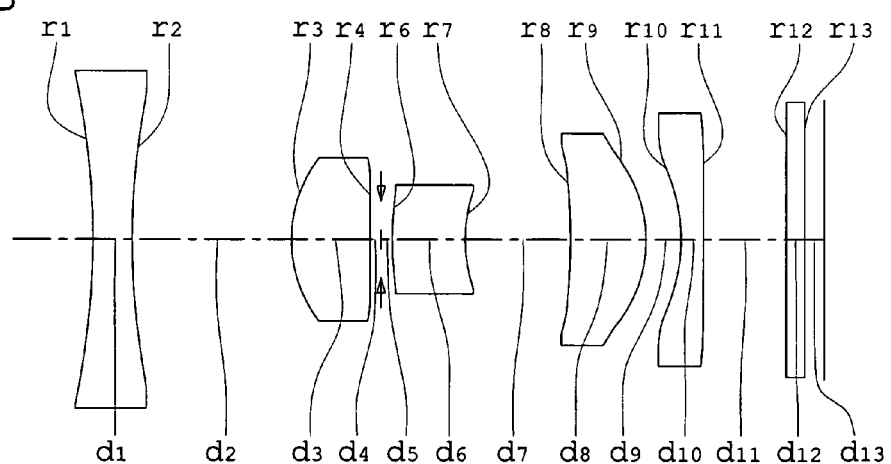
Figure 11A:
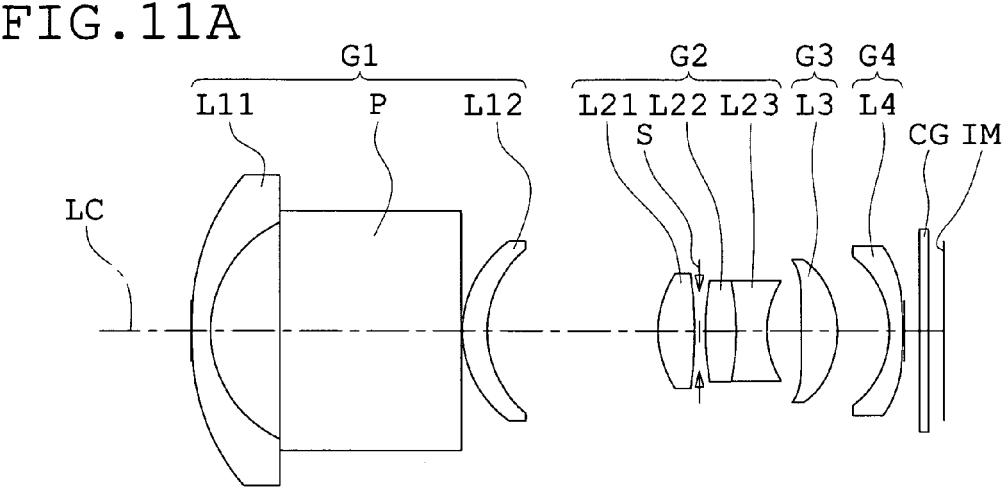
FIG. 11 is a sectional view showing an embodiment 6 of zoom lens system according to the present invention, developed along the optical axis.
Figure 11B:
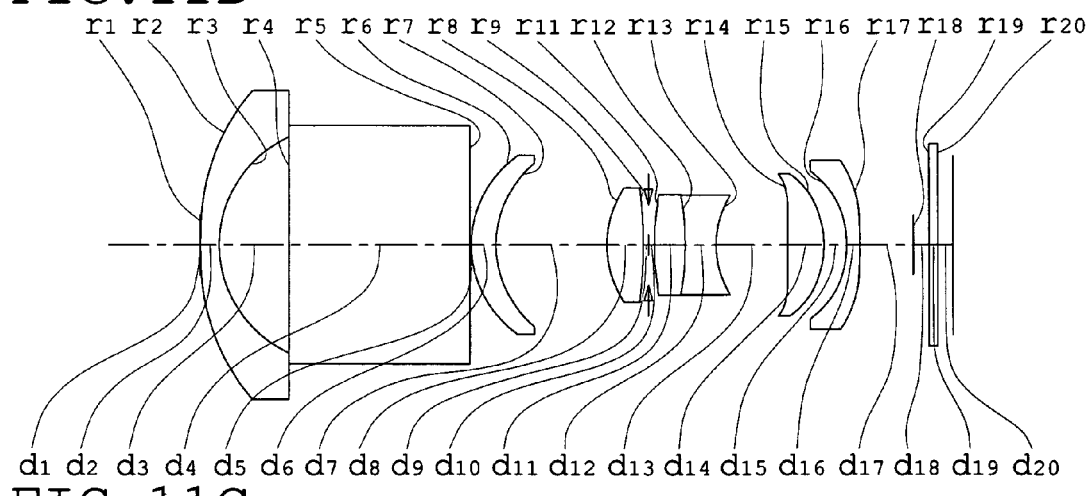
Figure 11C:
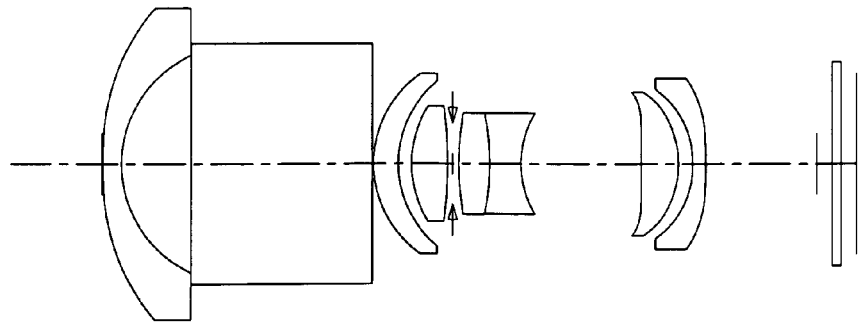
Figure 13A:
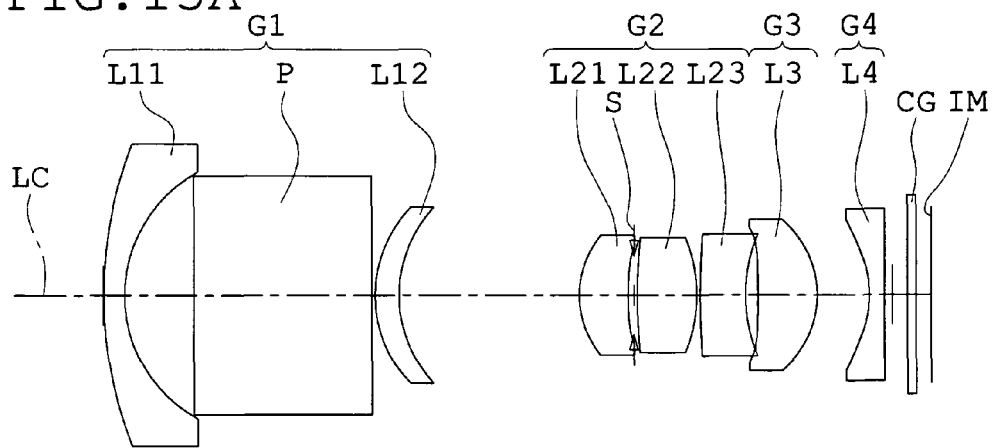
FIG. 13 is a sectional view showing an embodiment 7 of zoom lens system according to the present invention, developed along the optical axis.
Figure 13B:
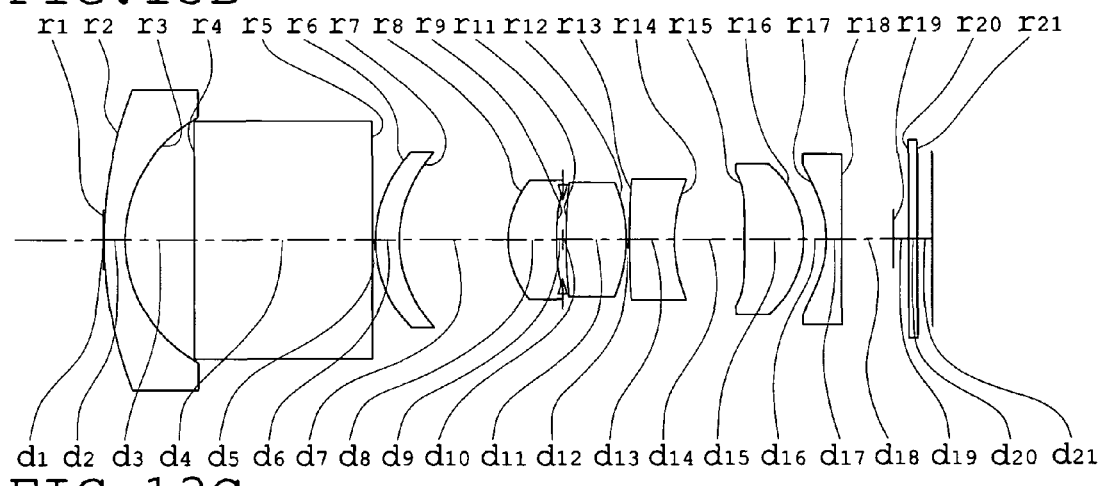
Figure 13C:
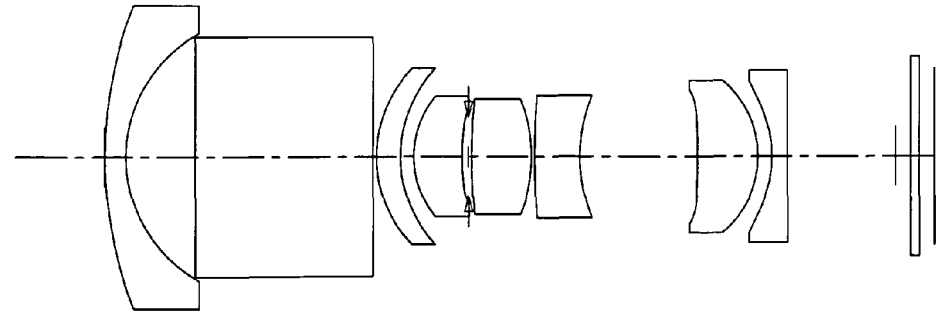
Figure 15A:
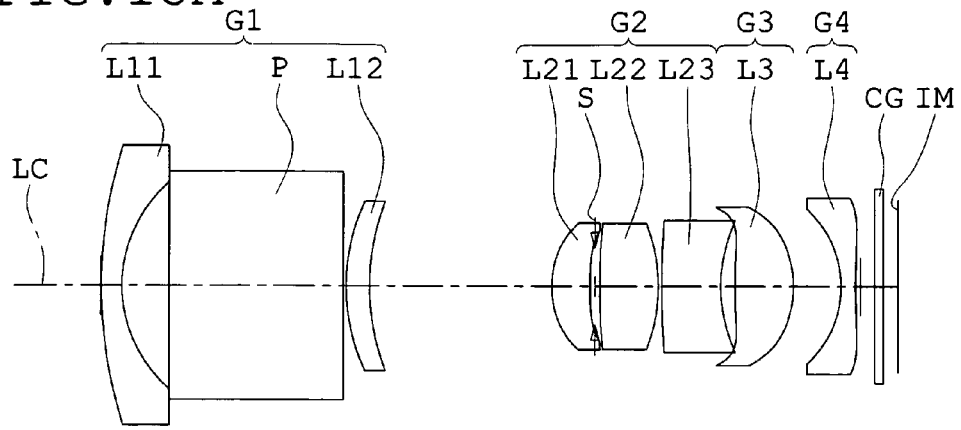
FIG. 15 is a sectional view showing an embodiment 8 of zoom lens system according to the present invention, developed along the optical axis.
Figure 15B:
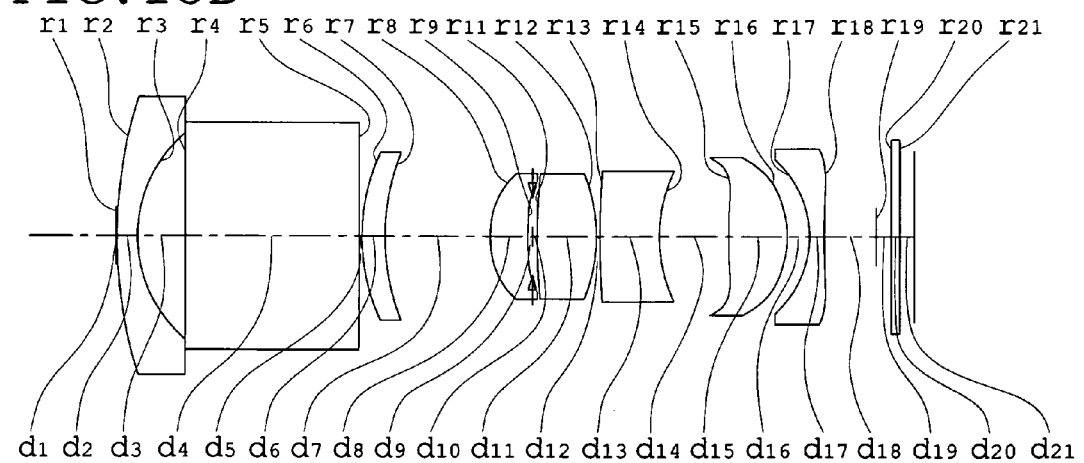
Figure 15C:
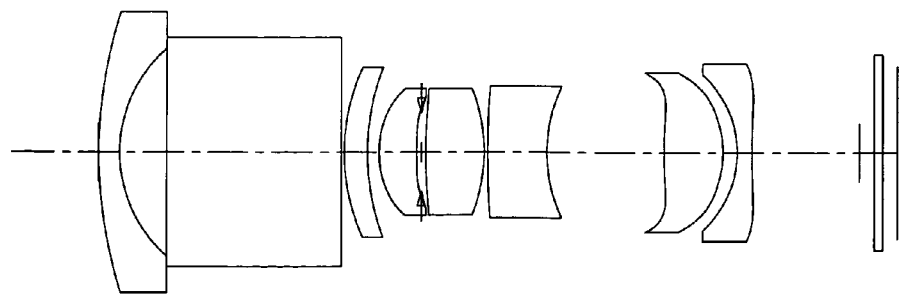
Figure 17A:
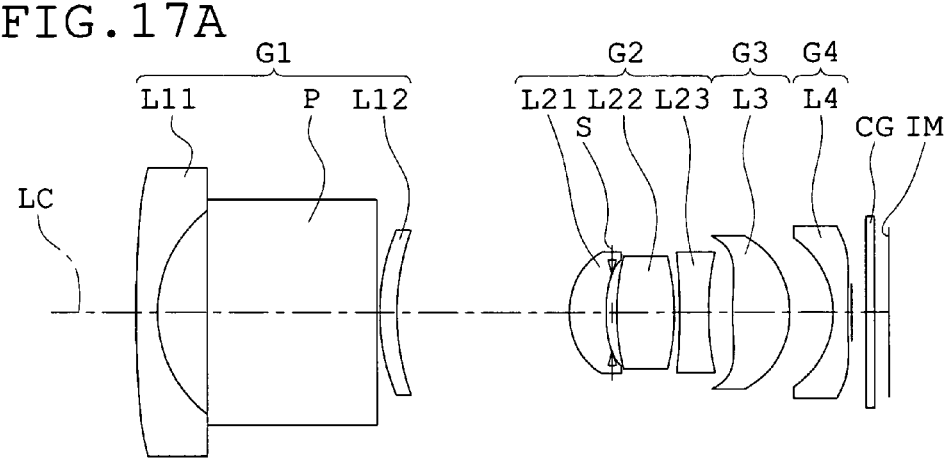
FIG. 17 is a sectional view showing an embodiment 9 of zoom lens system according to the present invention, developed along the optical axis.
Figure 17B:
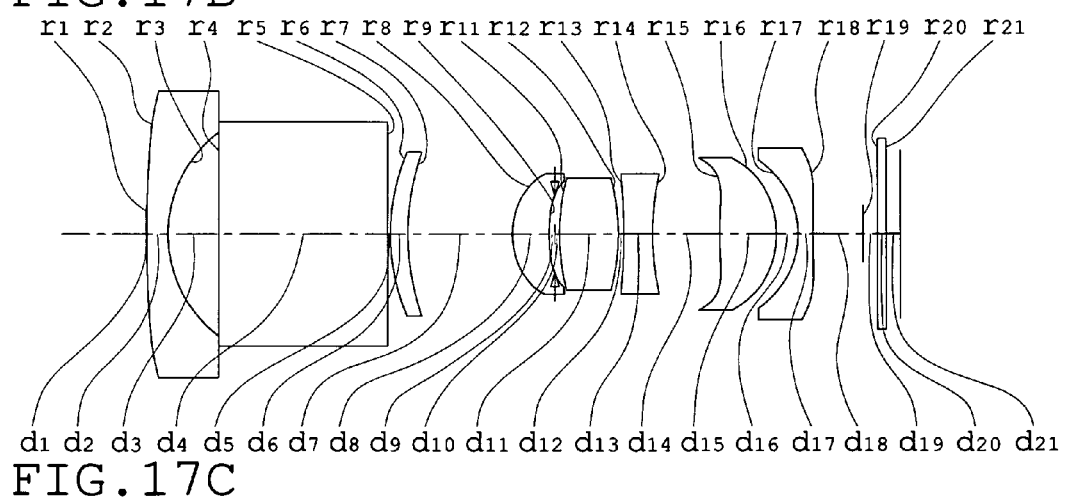
Figure 17C:
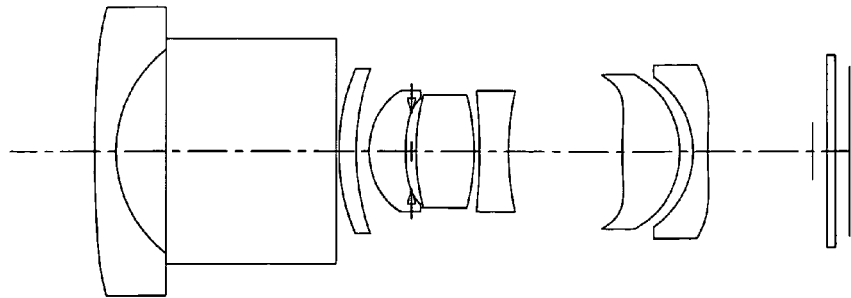

The embodiments 1, 2, 3, 4, 5, 6, 7, 8, and 9 in which zoom lens system in the present embodiments are used will be explained below A sectional view of a zoom lens system in the embodiment 1 is shown in FIG. 1, a sectional view of a zoom lens system in the embodiment 2 is shown in FIG. 3, a sectional view of a zoom lens system in the embodiment 3 is shown in FIG. 5, a sectional view of a zoom lens system in the embodiment 4 is shown in FIG. 7, a sectional view of a zoom lens system in the embodiment 5 is shown in FIG. 9, a sectional view of a zoom lens system in the embodiment 6 is shown in FIG. 11, a sectional view of a zoom lens system in the embodiment 7 is shown in FIG. 13, a sectional view of a zoom lens system in the embodiment 8 is shown in FIG. 15, and a sectional view of a zoom lens system in the embodiment 9 is shown in FIG. 17. In each of the drawings, "A" shows the state of zoom lens system in the wide angle end position, "B" shows the state of zoom lens system in the middle position, and "C" shows the state of zoom lens system in the telephoto end position.

Also, spherical aberration, astigmatism, distortion, and chromatic aberration of magnification in infinite object point focusing of the zoom lens system in the embodiment 1 are shown in FIG. 2. Spherical aberration, astigmatism, distortion, and chromatic aberration of magnification in infinite object point focusing of the zoom lens system in the embodiment 2 are shown in FIG. 4. Spherical aberration, astigmatism, distortion, and chromatic aberration of magnification in infinite object point focusing of the zoom lens system in the embodiment 3 are shown in FIG. 6. Spherical aberration, astigmatism, distortion, and chromatic aberration of magnification in infinite object point focusing of the zoom lens system in the embodiment 4 are shown in FIG. 8. Spherical aberration, astigmatism, distortion, and chromatic aberration of magnification in infinite object point focusing of the zoom lens system in the embodiment 5 are shown in FIG. 10. Spherical aberration, astigmatism, distortion, and chromatic aberration of magnification in infinite object point focusing of the zoom lens system in the embodiment 6 are shown in FIG. 12. Spherical aberration, astigmatism, distortion, and chromatic aberration of magnification in infinite object point focusing of the zoom lens system in the embodiment 7 are shown in FIG. 14. Spherical aberration, astigmatism, distortion, and chromatic aberration of magnification in infinite object point focusing of the zoom lens system in the embodiment 8 are shown in FIG. 16. Spherical aberration, astigmatism, distortion, and chromatic aberration of magnification in infinite object point focusing of the zoom lens system in the embodiment 9 are shown in FIG. 18. In each of the drawings, "A, B, C, and D" show the state in the wide angle end position, "E, F, G, and H" show the state in the middle position, and "I, J, K, and L" show the state in the telephoto end position.

Embodiment 1

The optical constitution of the zoom lens system of the present embodiment is explained using FIG. 1. In the zoom lens system of the present embodiment, a first lens group G1 with negative refractive power, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side. In the present embodiment, improvements on field curvature, coma, and chromatic aberration of magnification are particularly taken into consideration.

The first lens group G1 is a cemented lens which is composed of a first lens element L11 that is a biconcave lens, and a second lens element L12 that is a positive meniscus lens the convex surface of which faces toward the object side, in that order from the object side. Also, the border surface between the first lens element L11 and the second lens element L12 is shaped like aspherical surface.

Figure 1C:
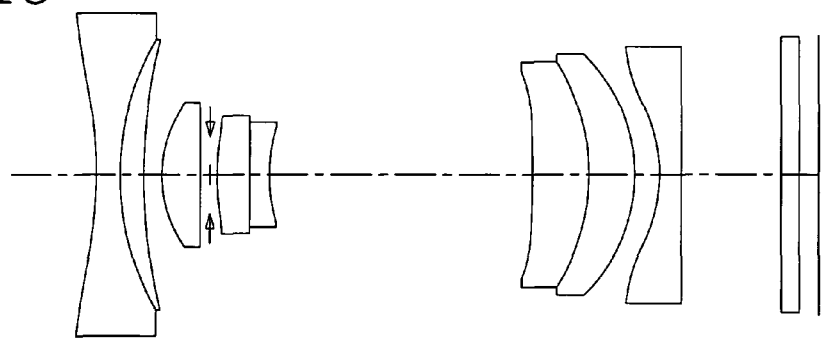
Figure 2A:
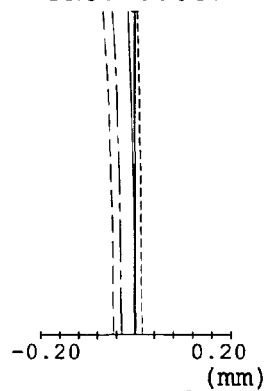
FIGS. 2A, 2B, 2C, and 2D show aberrations in the wide angle end position.
Figure 2B:
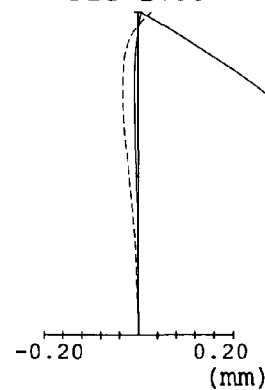
Figure 2C:
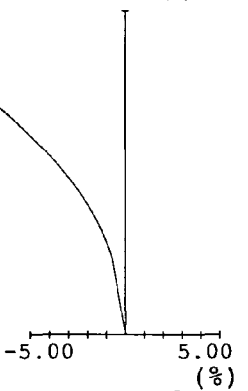
Figure 2D:
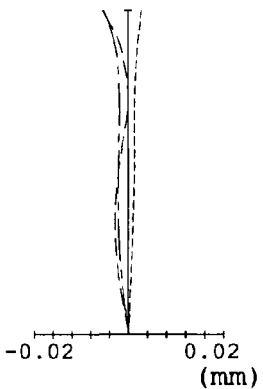
Figure 2E:
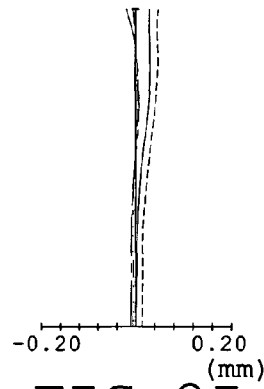
FIGS. 2E, 2F, 2G, and 2H show aberrations in the middle position.
Figure 2F:
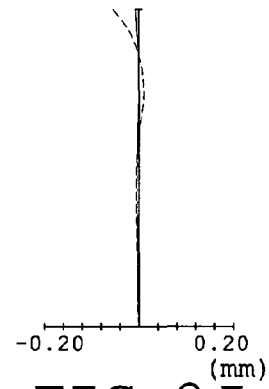
Figure 2G:
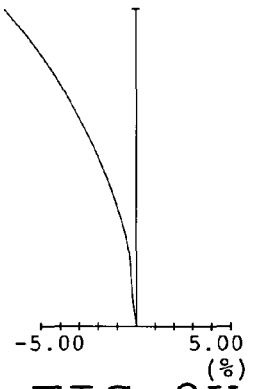
Figure 2H:
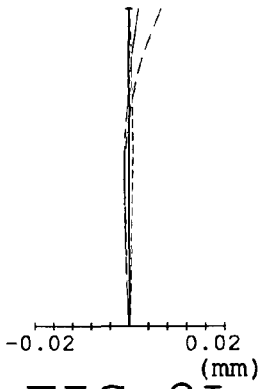
Figure 2I:
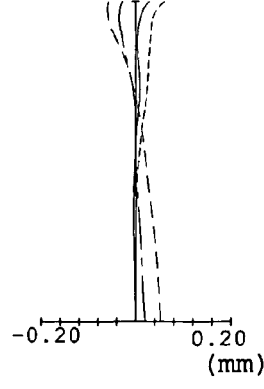
FIGS. 2I, 2J, 2K, and 2L show aberrations in the telephoto end position.
Figure 2J:
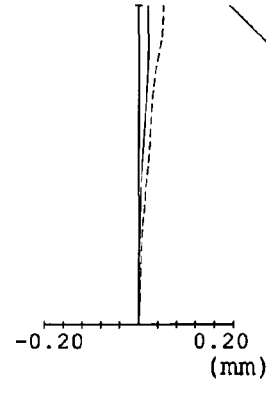
Figure 2K:
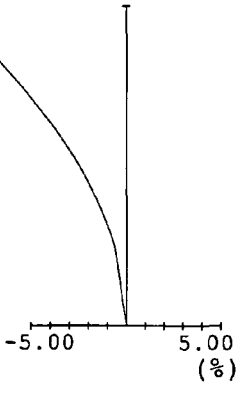
Figure 2L:
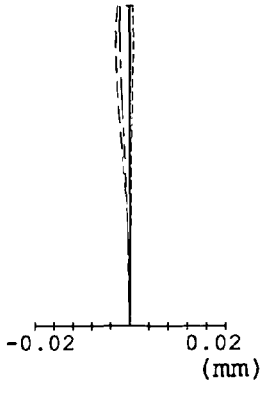

The second lens group G2 is composed of a first lens element L21 which is a biconvex lens, a second lens element L22 which is a biconvex lens, and a third lens element L23 which is a biconcave lens, in that order from the object side. And, the second lens element L22 and the third lens element L23 constitute a cemented lens. Also, an aperture stop S is arranged between the first lens element L21 and the second lens element L22. The aperture stop S is formed in such a way that the aperture diameter of the aperture stop S in the telephoto end position becomes larger than that of the aperture stop S in the wide angle end position, as shown in FIGS. 1A and 1C.

The third lens group G3 is a cemented lens which is composed of a first lens element L31 that is a positive meniscus lens the convex surface of which faces toward the image side, and a second lens element L32 that is a positive meniscus lens the convex surface of which faces toward the image side, in that order from the object side.

The fourth lens group G4 is composed of only a first lens element L4 which is a negative meniscus lens the convex surface of which faces toward the image side.

Also, in changing a magnification, the first lens group G1 does not move, and the second lens group G2, the third lens group G3, and the fourth lens group G4 move on the optical axis Lc. And, in changing a magnification from the wide angle end position to the telephoto end position, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 2

The optical constitution of the zoom lens system of the present embodiment is explained using FIG. 3. In the zoom lens system of the present embodiment, a first lens group G1 with negative refractive power, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side. In the present embodiment, improvements on field curvature, coma, and chromatic aberration of magnification are particularly taken into consideration.

The first lens group G1 is a cemented lens which is composed of a first lens element L 11 that is a biconcave lens, and a second lens element L12 that is a positive meniscus lens the convex surface of which faces toward the object side, in that order from the object side.

Figure 3C:
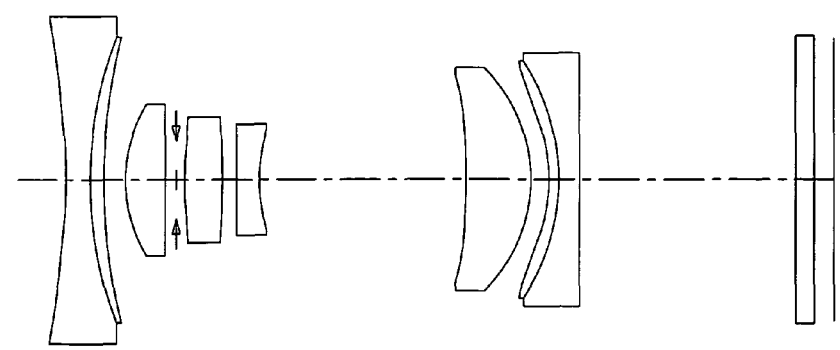
Figure 4A:
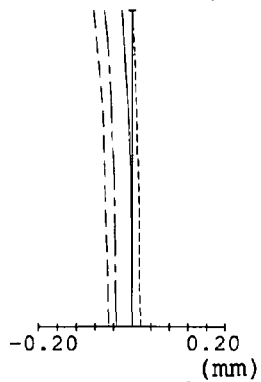
FIGS. 4A, 4B, 4C, and 4D show aberrations in the wide angle end position.
Figure 4B:
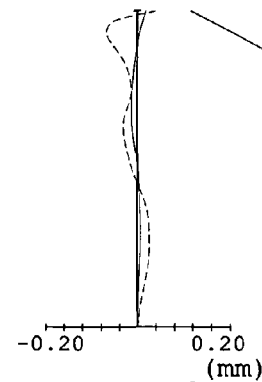
Figure 4C:
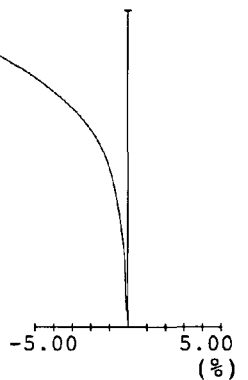
Figure 4D:
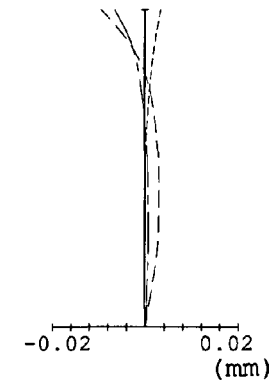
Figure 4E:
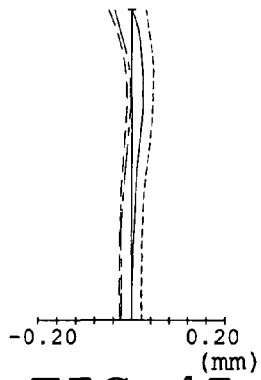
FIGS. 4E, 4F, 4G, and 4H show aberrations in the middle position.
Figure 4F:
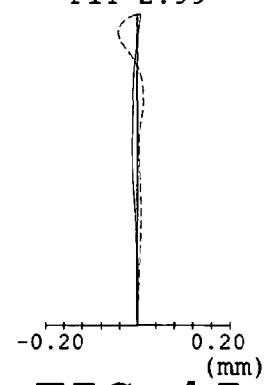
Figure 4G:
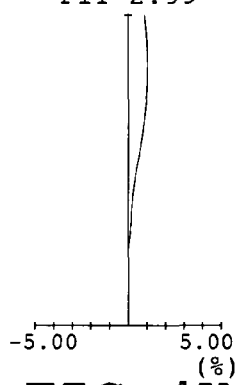
Figure 4H:
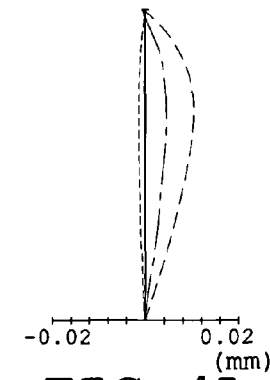
Figure 4I:
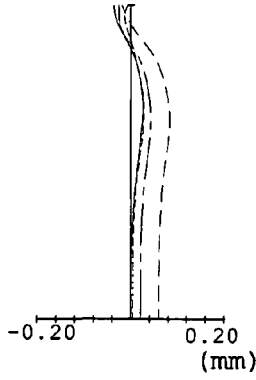
FIGS. 4I, 4J, 4K, and 4L show aberrations in the telephoto end position.
Figure 4J:
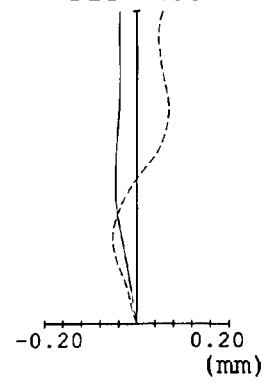
Figure 4K:
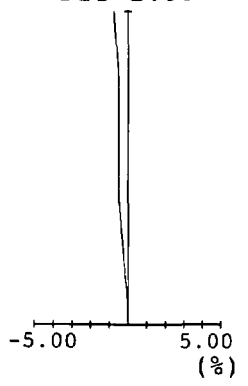
Figure 4L:
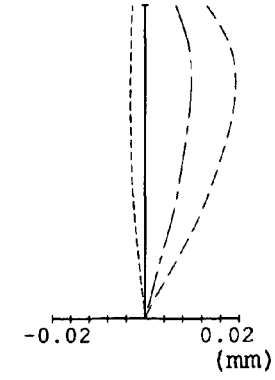

The second lens group G2 is composed of a first lens element L21 which is a biconvex lens, a second lens element L22 which is a biconvex lens, and a third lens element L23 which is a biconcave lens, in that order from the object side. Also, an aperture stop S is arranged between the first lens element L21 and the second lens element L22. The aperture stop S is formed in such a way that the aperture diameter of the aperture stop S in the telephoto end position becomes larger than that of the aperture stop S in the wide angle end position, as shown in FIGS. 3A and 3C.

The third lens group G3 is composed of only a first lens element L3 which is a positive meniscus lens the convex surface of which faces toward the image side.

The fourth lens group G4 is a cemented lens which is composed of a first lens element L41 that is a negative meniscus lens the convex surface of which faces toward the image side, and a second lens element L42 that is a negative meniscus lens the convex surface of which faces toward the image side, in that order from the object side.

Also, in changing a magnification, the first lens group G1 does not move, and the second lens group G2, the third lens group G3, and the fourth lens group G4 move on the optical axis Lc. And, in changing a magnification from the wide angle end position to the telephoto end position, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 3

The optical constitution of the zoom lens system of the present embodiment is explained using FIG. 5. In the zoom lens system of the present embodiment, a first lens group G1 with negative refractive power, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side. In the present embodiment, improvements on field curvature and coma are particularly taken into consideration.

The first lens group G1 is a cemented lens which is composed of a first lens element L11 that is a biconcave lens, and a second lens element L12 that is a positive meniscus lens the convex surface of which faces toward the object side, in that order from the object side. Also, the border surface between the first lens element L11 and the second lens element L12 is shaped like aspherical surface.

Figure 5C:
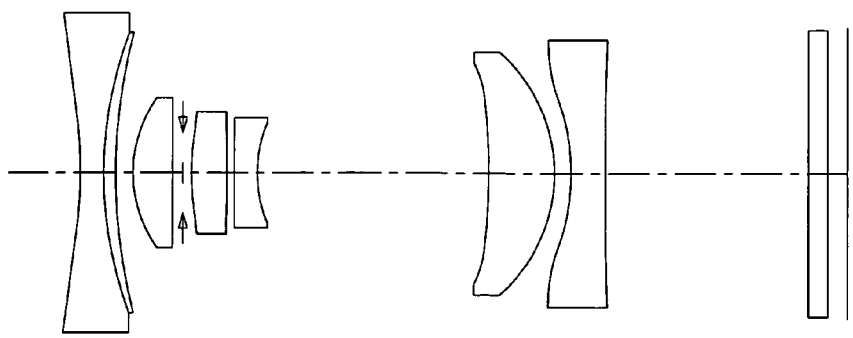
Figure 6A:
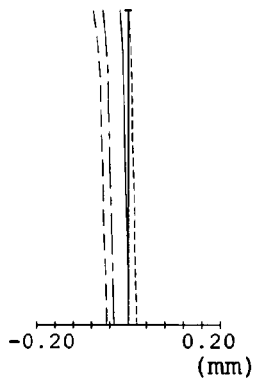
FIGS. 6A, 6B, 6C, and 6D show aberrations in the wide angle end position.
Figure 6B:
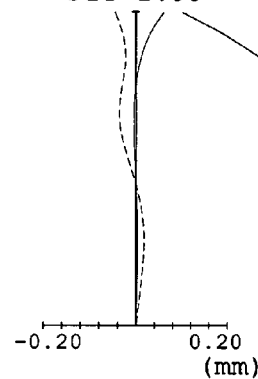
Figure 6C:
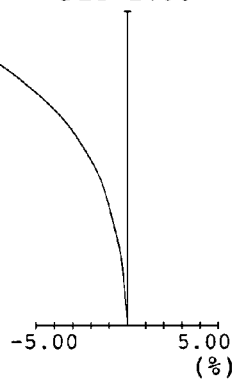
Figure 6D:
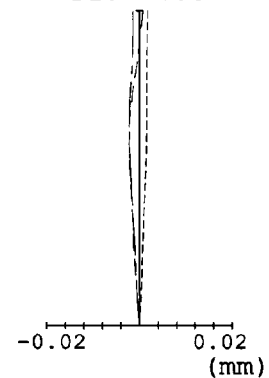
Figure 6E:
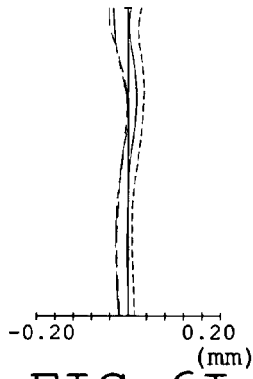
FIGS. 6E, 6F, 6G, and 6H show aberrations in the middle position.
Figure 6F:
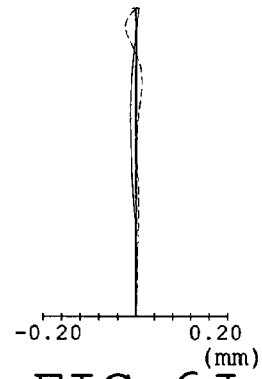
Figure 6G:
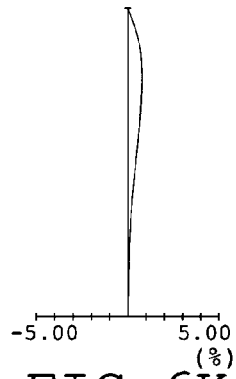
Figure 6H:
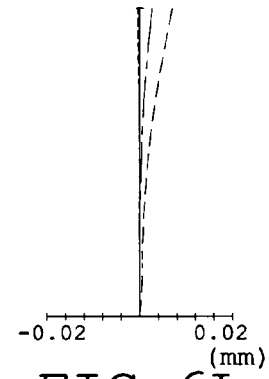
Figure 6I:
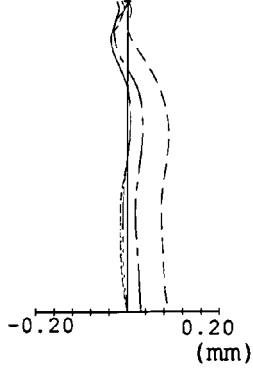
FIGS. 6I, 6J, 6K, and 6L show aberrations in the telephoto end position.
Figure 6J:
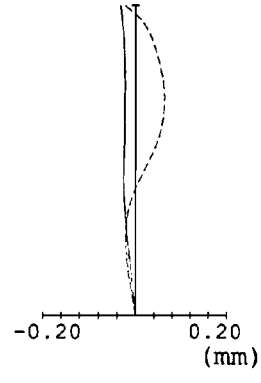
Figure 6K:
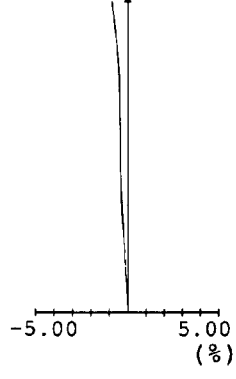
Figure 6L:
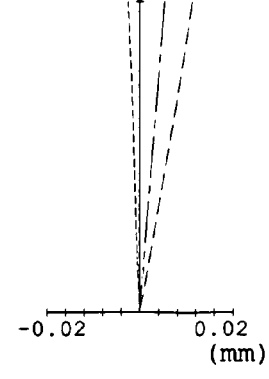

The second lens group G2 is composed of a first lens element L21 which is a biconvex lens, a second lens element L22 which is a biconvex lens, and a third lens element L23 which is a biconcave lens, in that order from the object side. Also, an aperture stop S is arranged between the first lens element L21 and the second lens element L22. The aperture stop S is formed in such a way that the aperture diameter of the aperture stop S in the telephoto end position becomes larger than that of the aperture stop S in the wide angle end position, as shown in FIGS. 5A and 5C.

The third lens group G3 is composed of only a first lens element L3 that is a positive meniscus lens the convex surface of which faces toward the image side.

The fourth lens group G4 is composed of only a first lens element L4 which is a negative meniscus lens the convex surface of which faces toward the image side.

Also, in changing a magnification, the first lens group G1 does not move, and the second lens group G2, the third lens group G3, and the fourth lens group G4 move on the optical axis Lc. And, in changing a magnification from the wide angle end position to the telephoto end position, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 4

The optical constitution of the zoom lens system of the present embodiment is explained using FIG. 7. In the zoom lens system of the present embodiment, a first lens group G1 with negative refractive power, a second lens group G2 with positive refractive power, a third lens group G3 with positive refractive power, and a fourth lens group G4 with negative refractive power are arranged on the optical axis Lc in that order from the object side. In addition, a to CCD cover glass CG and a CCD having the image plane IM are arranged on the image side of the fourth lens group G4 in that order from the object side.

The first lens group G1 is a cemented lens which is composed of a first lens element L11 that is a biconcave lens, and a second lens element L12 that is a positive meniscus lens the convex surface of which faces toward the object side, in that order from the object side. Also, the border surface between the first lens element L11 and the second lens element L12 is shaped like aspherical surface.

Figure 7C:
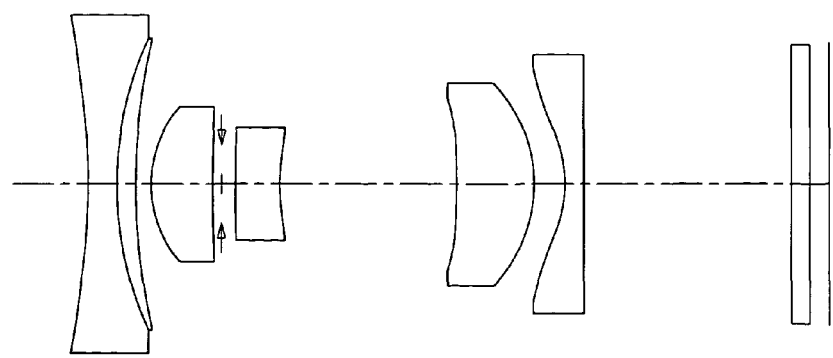

The second lens group G2 is composed of a first lens element L21 which is a biconvex lens, and a second lens element L22 which is a negative meniscus lens the convex surface of which faces toward the object side, in that order from the object side. Also, an aperture stop S is arranged between the first lens element L21 and the second lens element L22. The aperture stop S is formed in such a way that the aperture diameter of the aperture stop S in the telephoto end position becomes larger than that of the aperture stop S in the wide angle end position, as shown in FIGS. 7A and 7C.

The third lens group G3 is composed of only a first lens element L3 which is a positive meniscus lens the convex surface of which faces toward the image side.

The fourth lens group G4 is composed of only a first lens element LA which is a negative meniscus lens the convex surface of which faces toward the image side.

Also, in changing a magnification, the first lens group G1 does not move, and the second lens group G2, the third lens group G3, and the fourth lens group G4 move on the optical axis Lc. And, in changing a magnification from the wide angle end position to the telephoto end position, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 5

The optical constitution of the zoom lens system of the present embodiment is explained using FIG. 9. In the zoom lens system of the present embodiment, a first lens group G1 with negative refractive power, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side.

Figure 9C:
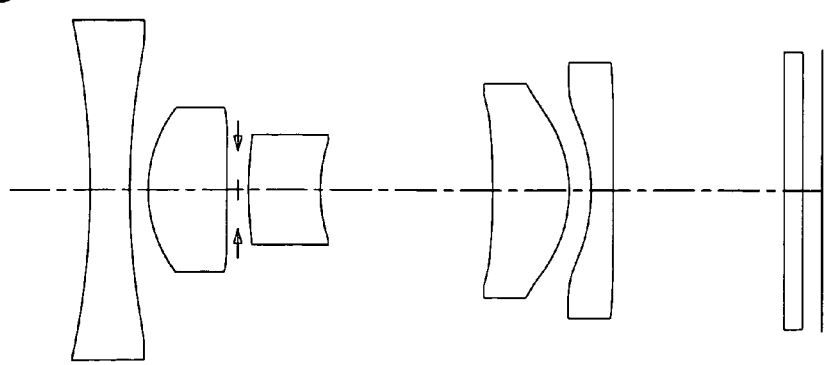
Figure 10A:
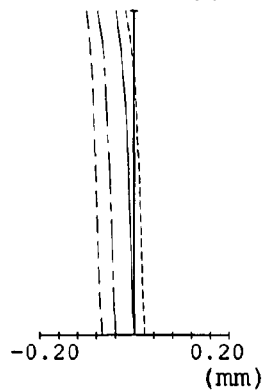
FIGS. 10A, 10B, 10C, and 10D show aberrations in the wide angle end position.
Figure 10B:
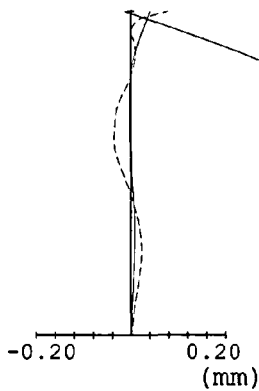
Figure 10C:
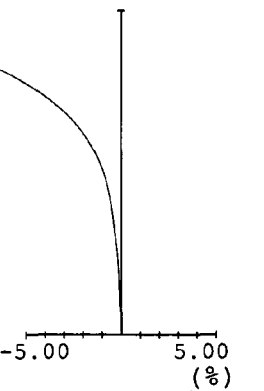
Figure 10D:
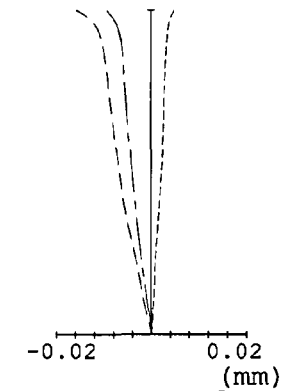
Figure 10E:
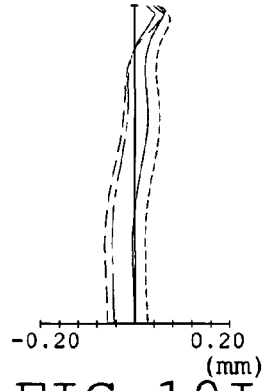
FIGS. 10E, 10F, 10G, and 10H show aberrations in the middle position.
Figure 10F:
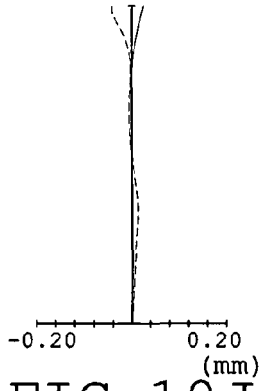
Figure 10G:
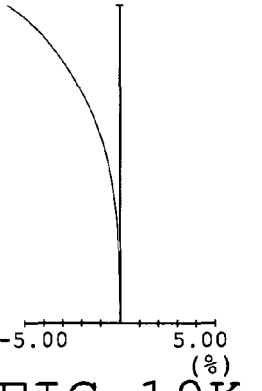
Figure 10H:
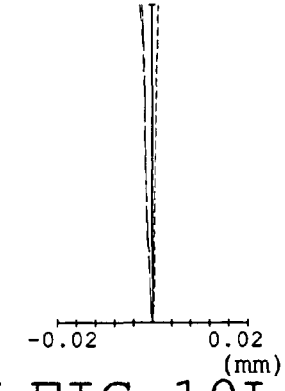
Figure 10I:
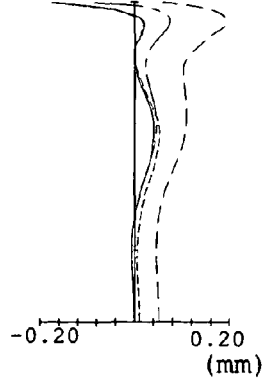
FIGS. 10I, 10J, 10K, and 10L show aberrations in the telephoto end position.
Figure 10J:
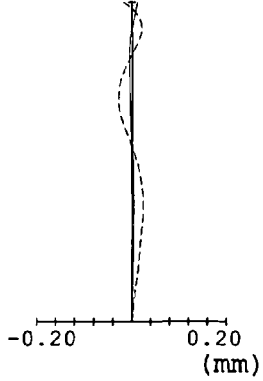
Figure 10K:
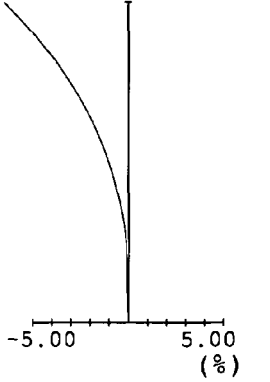
Figure 10L:
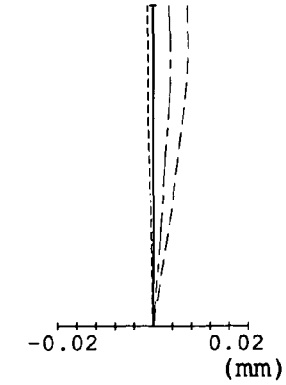

The first lens group G1 is composed of only a first lens element L1 that is a biconcave lens. The second lens group G2 is composed of a first lens element L21 which is a biconvex lens, and a second lens element L22 which is a negative meniscus lens the convex surface of which faces toward the object side, in that order from the object side. Also, an aperture stop S is arranged between the first lens element L21 and the second lens element L22. The aperture stop S is formed in such a way that the aperture diameter of the aperture stop S in the telephoto end position becomes larger than that of the aperture stop S in the wide angle end position, as shown in FIGS. 9A and 9C.

The third lens group G3 is composed of only a first lens element L3 that is a positive meniscus lens the convex surface of which faces toward the image side.

The fourth lens group G4 is composed of only a first lens element L4 which is a negative meniscus lens the convex surface of which faces toward the image side.

Also, in changing a magnification, the first lens group G1 does not move, and the second lens group G2, the third lens group G3, and the fourth lens group G4 move on the optical axis Lc. And, in changing a magnification from the wide angle end position to the telephoto end position, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 6

The optical constitution of the zoom lens system of the present embodiment is explained using FIG. 11. In the zoom lens system of the present embodiment, a first lens group G1 which has negative refractive power and includes a prism P for bending optical paths, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side.

The first lens group G1 is composed of a first lens element L1 that is a negative meniscus lens the convex surface of which faces toward the object side, the prism P that is a reflection optical element, and a second lens element L2 that is a positive meniscus lens the convex surface of which faces toward the object side, in that order from the object side.

The second lens group G2 is composed of a first lens element L21 which is a biconvex lens, a second lens element L22 which is a biconvex lens, and a third lens element L23 which is a biconcave lens, in that order from the object side. The second lens element L22 and the third lens element L23 constitute a cemented lens. And, an aperture stop S is arranged between the first lens element L21 and the second lens element L22.

The third lens group G3 is composed of a first lens element L31 which is a biconvex lens.

The fourth lens group G4 is composed of a first lens element L41 which is a negative meniscus lens the concave surface of which faces toward the object side.

In changing a magnification, the first lens group G1 does not move, and the second lens group G2, the third lens group G3, and the fourth lens group G4 move on the optical axis Lc. And, in moving from the wide angle end to the telephoto end, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 7

The optical constitution of the zoom lens system of the present embodiment is explained using FIG. 13. In the zoom lens system of the present embodiment, a first lens group G1 which has negative refractive power and includes a prism P for bending optical paths, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side.

The first lens group G1 is composed of a first lens element L1 that is a negative meniscus lens the convex surface of which faces toward the object side, the prism P that is a reflection optical element, and a second lens element L2 that is a positive meniscus lens the convex surface of which faces toward the object side, in that order from the object side.

The second lens group G2 is composed of a first lens element L21 which is a positive meniscus lens the convex surface of which faces toward the object side, a second lens element L22 which is a biconvex lens, and a third lens element L23 which is a negative meniscus lens the convex surface of which faces toward the object side, in that order from the object side. And, an aperture stop S is arranged between the first lens element L21 and the second lens element L22.

The third lens group G3 is composed of a first lens element L31 which is a positive meniscus lens the concave surface of which faces toward the object side.

The fourth lens group G4 is a cemented lens which is composed of a first lens element L41 that is a negative meniscus lens the concave surface of which faces toward the object side.

In changing a magnification, the first lens group G1 does not move, and the second lens group G2, the third lens group G3, and the fourth lens group G4 move on the optical axis Lc. And, in moving from the wide angle end to the telephoto end, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 8

The optical constitution of the zoom lens system of the present embodiment is explained using FIG. 15. In the zoom lens system of the present embodiment, a first lens group G1 which has negative refractive power and includes a prism P for bending optical paths, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side.

The first lens group G1 is composed of a first lens element L1 that is a negative meniscus lens the convex surface of which faces toward the object side, the prism P that is a reflection optical element, and a second lens element L2 that is a positive meniscus lens the convex surface of which faces toward the object side, in that order from the object side.

The second lens group G2 is composed of a first lens element L21 which is a positive meniscus lens the convex surface of which faces toward the object side, a second lens element L22 which is a biconvex lens, and a third lens element L23 which is a negative meniscus lens the convex surface of which faces toward the object side, in that order from the object side. And, an aperture stop S is arranged between the first lens element L21 and the second lens element L22.

The third lens group G3 is composed of a first lens element L31 which is a biconvex lens.

The fourth lens group G4 is composed of a first lens element L41 which is a biconcave lens.

In changing a magnification, the first lens group G1 does not move, and the second lens group G2, the third lens group G3, and the fourth lens group G4 move on the optical axis Lc. And, in moving from the wide angle end to the telephoto end, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Embodiment 9

The optical constitution of the zoom lens system of the present embodiment is explained using FIG. 17. In the zoom lens system of the present embodiment, a first lens group G1 which has negative refractive power and includes a prism P for bending optical paths, a second lens group G2 with positive refractive power, a third lens group G3 with positive refractive power, and a fourth lens group G4 with negative refractive power are arranged on the optical axis Lc in that order from the object side. In addition, a CCD cover glass CG and a CCD having the image plane IM are arranged on the image side of the fourth lens group G4 in that order from the object side.

The first lens group G1 is composed of a first lens element L1 that is a negative meniscus lens the convex surface of which faces toward the object side, the prism P that is a reflection optical element, and a second lens element L2 that is a positive meniscus lens the convex surface of which faces toward the object side, in that order from the object side.

The second lens group G2 is composed of a first lens element L21 which is a positive meniscus lens the convex surface of which faces toward the object side, a second lens element L22 which is a biconvex lens, and a third lens element L23 which is a biconcave lens, in that order from the object side. And, an aperture stop S is arranged between the first lens element L21 and the second lens element L22.

The third lens group G3 is composed of a first lens element L31 which is a biconvex lens.

The fourth lens group G4 is composed of a first lens element IA 1 which is a biconcave lens.

In changing a magnification, the first lens group G1 does not move, and the second lens group G2, the third lens group G3, and the fourth lens group G4 move on the optical axis Lc. And, in moving from the wide angle end to the telephoto end, the second, third and fourth lens groups G2, G3, and G4 move in such a way that: the distance between the first and second lens groups G1 and G2 becomes small; the distance between the second and third lens groups G2 and G3 becomes wide; and the distance between the third and fourth lens groups G3 and G4 becomes small.

Next, in each of the embodiments 1, 2, 3, 4, 5, 6, 7, 8, and 9, the numerical data of the optical members constituting the zoom lens system will be given. The embodiment 1 corresponds to a numerical embodiment 1. The embodiment 2 corresponds to a numerical embodiment 2. The embodiment 3 corresponds to a numerical embodiment 3. The embodiment 4 corresponds to a numerical embodiment 4. The embodiment 5 corresponds to a numerical embodiment 5. The embodiment 6 corresponds to a numerical embodiment 6. The embodiment 7 corresponds to a numerical embodiment 7. The embodiment 8 corresponds to a numerical embodiment 8. The embodiment 9 corresponds to a numerical embodiment 9.

Besides, in the numerical data and the drawings, r denotes the radius of curvature of each of lens surfaces, d denotes the thickness of each of lenses or air spacing between lenses, nd denotes the refractive index of each of lenses with respect to the d line (587.56 nm), vd denotes the Abbe's number of each of lenses with respect to the d line (587.56 nm), and * (asterisk) expresses aspherical surface. A unit of length is mm in the numerical data.

Also, when z is taken as a coordinate in the direction along the optical axis, y is taken as a coordinate in the direction perpendicular to the optical axis, K denotes a conic constant, and A4, A6, A8, and A10 denote an aspherical coefficient, the shapes of aspherical surfaces are expressed by the following equation (I):

$$z=(y^2/r)/[1+\{1-(1+K)(y/r)^2\}^{1/2}]+A4y^4+A6y^6+A8y^8+A10y^{10} \quad (I)$$

Also, E denotes a power of ten. Besides, these symbols for these various values are also common to the following numerical data of the embodiments.

Numerical Embodiment 1

Unit: mm

Surface data

| Surface No. | r | d | nd | vd | Effective diameter |
|---|---|---|---|---|---|
| Object plane | ∞ | ∞ | 1. | | |
| 1 * | −8.4530 | 0.5494 | 1.54454 | 55.90 | 3.482 |
| 2 * | 8.4303 | 0.5023 | 1.63387 | 23.38 | 2.888 |
| 3 * | 22.7777 | variable | 1. | | 2.850 |
| 4 * | 2.7282 | 0.8650 | 1.54454 | 55.90 | 1.514 |
| 5 | −2.230E+04 | 0.2000 | 1. | | 1.395 |
| 6 (Stop) | ∞ | 0.1574 | 1. | | variable |
| 7 * | 6.4867 | 0.7613 | 1.54454 | 55.90 | 1.226 |
| 8 | −281.4788 | 0.4194 | 1.63227 | 23.26 | 1.083 |
| 9 * | 3.4869 | variable | 1. | | 0.980 |
| 10 * | −1.415E+05 | 1.2518 | 1.54454 | 55.90 | 2.214 |
| 11 | −4.9634 | 1.0600 | 1.60687 | 27.03 | 2.418 |
| 12 * | −3.1693 | variable | 1. | | 2.593 |
| 13 * | −2.6481 | 0.4500 | 1.53071 | 55.67 | 2.626 |
| 14 | −921.2656 | variable | 1. | | 2.744 |
| 15 | ∞ | 0.4000 | 1.51633 | 64.14 | 2.932 |
| 16 | ∞ | 0.3996 | 1. | | 2.942 |
| Image plane | ∞ | 0 | | | |

Aspherical surface data

The first surface

K = 0.9888, A2 = 0.0000E+00, A4 = 3.2608E−03,
A6 = −8.4137E−05, A8 = 1.6779E−06, A10 = 0.0000E+00
The second surface K = −2.7726, A2 = 0.0000E+00, A4 = 6.5160E−03,
A6 = −3.3294E−04, A8 = 0.0000E+00, A10 = 0.0000E+00
The third surface K = 39.4145, A2 = 0.0000E+00, A4 = 2.4081E−03,
A6 = −6.8952E−05, A8 = −1.9995E−06, A10 = 0.0000E+00
The fourth surface K = −0.2656, A2 = 0.0000E+00, A4 = 2.0473E−03,
A6 = 7.0232E−05, A8 = 2.9689E−04, A10 = −1.9357E−05
The seventh surface K = −6.6415, A2 = 0.0000E+00, A4 = −4.4344E−03,
A6 = −1.6830E−03, A8 = −1.3342E−04, A10 = −5.5023E−05
The ninth surface K = −0.3699, A2 = 0.0000E+00, A4 = 5.6352E−03,
A6 = −8.6901E−04, A8 = 7.5588E−04, A10 = 0.0000E+00
The tenth surface K = −2.440E+09, A2 = 0.0000E+00, A4 = −5.7928E−03,
A6 = −5.3350E−04, A8 = 5.1064E−05, A10 = 0.0000E+00

-continued

Unit: mm

The twelfth surface

K = −1.0895, A2 = 0.0000E+00, A4 = −4.5642E−04,
A6 = 1.0424E−04, A8 = 0.0000E+00, A10 = 0.0000E+00
The thirteenth surface K = −1.2883, A2 = 0.0000E+00, A4 = 1.0364E−02,
A6 = 1.3690E−04, A8 = −1.9207E−05, A10 = 0.0000E+00

Various data
Zoom ratio: 2.85

| | Wide angle end | Middle | Telephoto end |
|---|---|---|---|
| Focal length | 4.7016 | 7.8998 | 13.3996 |
| F number | 3.6467 | 4.0505 | 5.3651 |
| Half angle of view | 35.31 | 21.41 | 13.35 |
| Image height | 2.9 | 2.9 | 2.9 |
| The total length of lens | 16.0001 | 15.9993 | 16.0009 |
| BF | 0.8634 | 1.5425 | 2.8430 |
| D3 | 5.80334 | 3.35362 | 0.40097 |
| D9 | 1.23307 | 3.88326 | 5.82001 |
| D12 | 1.74750 | 0.86707 | 0.58411 |
| D14 | 0.20000 | 0.87890 | 2.17938 |
| Effective diameter of the sixth surface | 0.88788 | 1.18949 | 1.29557 |
| Entrance pupil position | 4.6853 | 3.5783 | 1.7254 |
| Exit pupil position | −3.7714 | −5.8205 | −7.3987 |
| Position of front side principal point | 4.6175 | 3.0024 | −2.4064 |
| Position of rear side principal point | −4.3020 | −7.5000 | −12.9998 |

Single lens data

| Lens | The first surface of single lens | Focal length |
|---|---|---|
| 1 | 1 | −7.6632 |
| 2 | 2 | 20.8314 |
| 3 | 4 | 5.0096 |
| 4 | 7 | 11.6549 |
| 5 | 8 | −5.4443 |
| 6 | 10 | 9.1152 |
| 7 | 11 | 11.8121 |
| 8 | 13 | −5.0050 |

Zoom lens group data

| Group | The first surface of lens group | Focal length | Length of lens constitution | Magnification (Wide angle end) |
|---|---|---|---|---|
| 1 | 1 | −12.12046 | 1.05171 | 0 |
| 2 | 4 | 6.39759 | 2.40315 | −0.60205 |
| 3 | 10 | 5.53990 | 2.31176 | 0.52322 |
| 4 | 13 | −5.00495 | 0.45000 | 1.23142 |

| Group | The first surface of lens group | Magnification (Telephoto end) | Position of front side principal point | Position of rear side principal point |
|---|---|---|---|---|
| 1 | 1 | 0 | 0.17760 | −0.47739 |
| 2 | 4 | −1.22465 | −1.37724 | −2.45779 |
| 3 | 10 | 0.55486 | 1.51023 | 0.04592 |
| 4 | 13 | 1.62695 | −0.00085 | −0.29488 |

Numerical Embodiment 2

Unit: mm

Surface data

| Surface No. | r | d | nd | vd | Effective diameter |
|---|---|---|---|---|---|
| Object plane | ∞ | ∞ | 1. | | |
| 1* | −10.9650 | 0.4989 | 1.54454 | 55.90 | 3.333 |
| 2 | 7.7032 | 0.3102 | 1.63387 | 23.38 | 2.884 |
| 3* | 15.6634 | variable | 1. | | 2.850 |
| 4* | 3.0654 | 0.8603 | 1.54454 | 55.90 | 1.506 |
| 5 | −1.075E+04 | 0.2000 | 1. | | 1.385 |
| 6 (Stop) | ∞ | 0.1555 | 1. | | variable |
| 7* | 7.1984 | 0.7749 | 1.54454 | 55.90 | 1.243 |
| 8 | −490.5624 | 0.3104 | 1. | | 1.138 |
| 9 | −506.0021 | 0.4591 | 1.63227 | 23.26 | 1.063 |
| 10* | 3.8503 | variable | 1. | | 0.980 |
| 11 | −3.068E+05 | 1.3851 | 1.54454 | 55.90 | 2.043 |
| 12* | −2.7492 | variable | 1. | | 2.245 |
| 13* | −3.1823 | 0.2039 | 1.63387 | 23.38 | 2.359 |
| 14 | −4.5885 | 0.4732 | 1.53071 | 55.67 | 2.380 |
| 15 | −3953.1847 | variable | 1. | | 2.593 |
| 16 | ∞ | 0.4000 | 1.51633 | 64.14 | 2.932 |
| 17 | ∞ | 0.3995SZ | 1. | | 2.942 |
| Image plane | ∞ | 0 | | | |

Aspherical surface data

The first surface

K = 6.8122, A2 = 0.0000E+00, A4 = 4.2712E−03,
A6 = −2.8933E−04, A8 = 1.3603E−05, A10 = 0.0000E+00

The third surface

K = 0.6987, A2 = 0.0000E+00, A4 = 2.8008E−03,
A6 = −2.5794E−04, A8 = 1.0657E−05, A10 = 0.0000E+00

The fourth surface

K = 0.3792, A2 = 0.0000E+00, A4 = 3.5275E−04,
A6 = −1.4735E−04, A8 = 3.2467E−04, A10 = −3.7650E−05

The seventh surface

K = −3.8962, A2 = 0.0000E+00, A4 = −8.2570E−03,
A6 = −1.8950E−03, A8 = −1.7921E−04, A10 = −1.4897E−06

The tenth surface

K = −0.1423, A2 = 0.0000E+00, A4 = −1.8747E−05,
A6 = −2.8155E−03, A8 = 1.2765E−03, A10 = 0.0000E+00

The eleventh surface

K = −1.987E+09, A2 = 0.0000E+00, A4 = −6.2284E−03,
A6 = −1.5779E−03, A8 = 1.9392E−04, A10 = 0.0000E+00

The twelfth surface

K = −5.2437, A2 = 0.0000E+00, A4 = −1.8939E−02,
A6 = 1.5994E−03, A8 = 0.0000E+00, A10 = 0.0000E+00

The thirteenth surface

K = −9.3350, A2 = 0.0000E+00, A4 = −1.7565E−02,
A6 = 4.0850E−03, A8 = −2.4669E−04, A10 = 0.0000E+00

Various data
Zoom ratio: 2.85

| | Wide angle end | Middle | Telephoto end |
|---|---|---|---|
| Focal length | 4.7025 | 7.8996 | 13.3991 |
| F number | 3.6756 | 4.0236 | 5.1660 |
| Half angle of view | −34.49 | 20.00 | 12.31 |
| Image height | 2.9 | 2.9 | 2.9 |
| The total length of lens | 16.0004 | 15.9996 | 16.0008 |
| BF | 1.0986 | 2.1854 | 5.1303 |
| D3 | 6.21560 | 3.52090 | 0.39867 |
| D10 | 1.37610 | 3.77317 | 4.36104 |
| D12 | 1.54256 | 0.75249 | 0.34314 |
| D15 | 0.43525 | 1.52183 | 4.46685 |

Unit: mm

| | | | |
|---|---|---|---|
| Effective diameter of the sixth surface | 0.88788 | 1.18949 | 1.29557 |
| Entrance pupil position | 4.8712 | 3.6321 | 1.6074 |
| Exit pupil position | −4.2131 | −6.9969 | −7.7886 |
| Position of front side principal point | 5.4104 | 4.7356 | 1.1094 |
| Position of rear side principal point | −4.3030 | −7.4998 | −12.9994 |

Single lens data

| Lens | The first surface of single lens | Focal length |
|---|---|---|
| 1 | 1 | −8.2315 |
| 2 | 2 | 23.5571 |
| 3 | 4 | 5.6279 |
| 4 | 7 | 13.0352 |
| 5 | 9 | −6.0415 |
| 6 | 11 | 5.0486 |
| 7 | 13 | −17.3576 |
| 8 | 14 | −8.6564 |

Zoom lens group data

| Group | The first surface of lens group | Focal length | Length of lens constitution | Magnification (Wide angle end) |
|---|---|---|---|---|
| 1 | 1 | −12.61240 | 0.80906 | 0 |
| 2 | 4 | 6.81225 | 2.76013 | −0.64167 |
| 3 | 11 | 5.04864 | 1.38510 | 0.45657 |
| 4 | 13 | −5.68176 | 0.67714 | 1.27266 |

| Group | The first surface of lens group | Magnification (Telephoto end) | Position of front side principal point | Position of rear side principal point |
|---|---|---|---|---|
| 1 | 1 | 0 | −0.29301 | 0.30191 |
| 2 | 4 | −1.41937 | −2.90151 | 1.55096 |
| 3 | 11 | 0.37759 | 0.00001 | 0.48833 |
| 4 | 13 | 1.98226 | −0.45065 | 0.24276 |

Numerical Embodiment 3

Unit: mm

Surface data

| Surface No. | r | d | nd | vd | Effective diameter |
|---|---|---|---|---|---|
| Object plane | ∞ | ∞ | 1. | | |
| 1* | −13.0201 | 0.5005 | 1.58313 | 59.38 | 3.313 |
| 2* | 9.5566 | 0.2606 | 1.63387 | 23.38 | 2.882 |
| 3* | 14.1833 | variable | 1. | | 2.850 |
| 4* | 3.0008 | 0.8458 | 1.54454 | 55.90 | 1.499 |
| 5 | −1.964E+04 | 0.2000 | 1. | | 1.384 |
| 6 (Stop) | ∞ | 0.1518 | 1. | | variable |
| 7* | 4.4399 | 0.7801 | 1.54454 | 55.90 | 1.235 |
| 8* | −378.8363 | 0.1675 | 1. | | 1.132 |
| 9 | −389.6943 | 0.4786 | 1.60687 | 27.03 | 1.081 |
| 10* | 2.6295 | variable | 1. | | 0.980 |
| 11* | −2.028E+05 | 1.4167 | 1.54454 | 55.90 | 2.279 |
| 12* | −2.9832 | variable | 1. | | 2.484 |
| 13* | −3.6860 | 0.6942 | 1.54454 | 55.90 | 2.631 |
| 14* | −8766.4733 | variable | 1. | | 2.749 |
| 15 | ∞ | 0.4000 | 1.51633 | 64.14 | 2.932 |
| 16 | ∞ | 0.4000 | 1. | | 2.942 |
| Image plane | ∞ | 0 | | | |

-continued

Unit: mm

Aspherical surface data

The first surface

K = 8.8053, A2 = 0.0000E+00, A4 = 1.9481E−03,
A6 = −8.6255E−05, A8 = 5.9958E−06, A10 = 0.0000E+00
The second surface K = 0.0077, A2 = 0.0000E+00, A4 = −1.7118E−04,
A6 = 1.2258E−04, A8 = 0.0000E+00, A10 = 0.0000E+00
The third surface K = 2.2663, A2 = 0.0000E+00, A4 = 8.7413E−04,
A6 = −8.3672E−05, A8 = 8.6180E−06, A10 = 0.0000E+00
The fourth surface K = 0.5702, A2 = 0.0000E+00, A4 = 3.9549E−04,
A6 = −6.7297E−05, A8 = 1.2869E−04, A10 = −6.3050E−06
The seventh surface K = −0.1587, A2 = 0.0000E+00, A4 = −1.4584E−02,
A6 = −4.8736E−03, A8 = 1.1968E−03, A10 = −5.3555E−04
The eighth surface K = 1.015E+05, A2 = 0.0000E+00, A4 = −7.1816E−03,
A6 = −6.1465E−04, A8 = 0.0000E−00, A10 = 0.0000E+00
The tenth surface K = −0.3103, A2 = 0.0000E+00, A4 = 3.3139E−03,
A6 = −3.3326E−03, A8 = 1.2384E−03, A10 = 0.0000E+00
The eleventh surface K = −1.934E+09, A2 = 0.0000E+00, A4 = −5.5394E−03,
A6 = −1.2191E−03 A8 = 1.2173E−04, A10 = 0.0000E+00
The twelfth surface K = −4.7468, A2 = 0.0000E+00, A4 = −1.3520E−02,
A6 = 7.0373E−04, A8 = 0.0000E+00, A10 = 0.0000E+00
The thirteenth surface K = −9.7335, A2 = 0.0000E+00, A4 = −7.2321E−03,
A6 = 2.0854E−03 A8 = −1.1702E−04, A10 = 0.0000E+00
The fourteenth surface K = 8.544E+08, A2 = 0.0000E+00, A4 = 2.4465E−03,
A6 = −1.7766E−04, A8 = −2.2458E−06, A10 = 0.0000E+00

Various data
Zoom ratio: 2.85

| | Wide angle end | Middle | Telephoto end |
|---|---|---|---|
| Focal length | 4.7002 | 7.8999 | 13.4001 |
| F number | 3.7709 | 4.0924 | 5.1741 |
| Half angle of view | 34.63 | 20.12 | 12.30 |
| Image height | 2.9 | 2.9 | 2.9 |
| The total length of lens | 16.0000 | 15.9998 | 15.9999 |
| BF | 1.0240 | 1.5895 | 4.8999 |
| D3 | 6.30989 | 3.55502 | 0.40320 |
| D10 | 1.52559 | 4.44885 | 4.74336 |
| D12 | 1.50804 | 0.77439 | 0.32148 |
| D14 | 0.36024 | 0.92574 | 4.23602 |
| Effective diameter of the sixth surface | 0.88788 | 1.18949 | 1.29557 |
| Entrance pupil position | 4.7785 | 3.5682 | 1.5673 |
| Exit pupil position | −4.4937 | −8.4820 | −8.9651 |
| Position of front side principal point | 5.4749 | 5.2716 | 2.0165 |
| Position of rear side principal point | −4.3002 | −7.4999 | −13.0001 |

Single lens data

| Lens | The first surface of single lens | Focal length |
|---|---|---|
| 1 | 1 | −9.3748 |
| 2 | 2 | 45.2299 |
| 3 | 4 | 5.5100 |
| 4 | 7 | 8.0648 |
| 5 | 9 | −4.3019 |
| 6 | 11 | 5.4785 |
| 7 | 13 | −6.7720 |

Zoom lens group data

| Group | The first surface of lens group | Focal length | Length of lens constitution | Magnification (Wide angle end) |
|---|---|---|---|---|
| 1 | 1 | −11.76382 | 0.76111 | 0 |
| 2 | 4 | 6.46610 | 2.62381 | −0.65126 |
| 3 | 11 | 5.47849 | 1.41669 | 0.50385 |
| 4 | 13 | −6.77199 | 0.69420 | 1.21762 |

| Group | The first surface of lens group | Magnification (Telephoto end) | Position of front side principal point | Position of rear side principal point |
|---|---|---|---|---|
| 1 | 1 | 0 | 0.23018 | −0.24050 |
| 2 | 4 | −1.60771 | −1.91949 | −2.83922 |
| 3 | 11 | 0.38771 | 1.08992 | 0.00001 |
| 4 | 13 | 1.78995 | −0.00019 | −0.244965 |

Numerical Embodiment 4

Unit: mm

Surface data

| Surface No. | r | d | nd | vd | Effective diameter |
|---|---|---|---|---|---|
| Object plane | ∞ | ∞ | 1. | | |
| 1 * | −10.9672 | 0.6400 | 1.54454 | 55.90 | 3.606 |
| 2 * | 12.4773 | 0.3865 | 1.63387 | 23.38 | 3.045 |
| 3 * | 18.4967 | variable | 1. | | 3.000 |
| 4 * | 2.7778 | 1.3154 | 1.54454 | 55.90 | 1.616 |
| 5 * | −2.331E+04 | 0.2000 | 1. | | 1.311 |
| 6 (Stop) | ∞ | 0.2500 | 1. | | variable |
| 7 * | 16.3389 | 0.9726 | 1.62980 | 19.20 | 1.172 |
| 8 * | 4.7537 | variable | 1. | | 1.050 |
| 9 * | −2.121E+05 | 1.6834 | 1.54454 | 55.90 | 1.824 |
| 10 * | −2.9018 | variable | 1. | | 2.136 |
| 11 * | −2.7194 | 0.4500 | 1.53071 | 55.67 | 2.464 |
| 12 | −1111.9523 | variable | 1. | | 2.739 |
| 13 | ∞ | 0.4000 | 1.51633 | 64.14 | 2.890 |
| 14 | ∞ | 0.3995 | 1. | | 2.966 |
| Image plane | ∞ | 0 | | | |

Aspherical surface data

The first surface

K = 2.0351, A2 = 0.0000E+00, A4 = 3.7180E−03,
A6 = −2.4145E−04, A8 = 7.3163E−06, A10 = 0.0000E+00
The second surface K = 0.4494, A2 = 0.0000E+00, A4 = 9.5068E−03,
A6 = −1.3013E−03, A8 = 6.5587E−05, A10 = 0.0000E+00
The third surface K = 26.6308, A2 = 0.0000E+00, A4 = 3.5642E−03,
A6 = −4.5960E−04, A8 = 1.5817E−05, A10 = 0.0000E+00
The fourth surface K = −0.1182, A2 = 0.0000E+00, A4 = 2.6554E−03,
A6 = 6.3836E−04, A8 = 2.2038E−06, A10 = 4.5950E−05

-continued

Unit: mm

The fifth surface

K = −1.157E+09, A2 = 0.0000E+00, A4 = 1.0894E−02,
A6 = −9.9810E−04, A8 = 0.0000E+00, A10 = 0.0000E+00
The seventh surface K = 52.7438, A2 = 0.0000E+00, A4 = −2.8654E−03,
A6 = −5.6948E−03, A8 = 1.5740E−03, A10 = −6.6403E−04
The eighth surface K = 0.3832, A2 = 0.0000E+00, A4 = −2.9564E−03,
A6 = −2.8904E−03, A8 = 5.5043E−04, A10 = 0.0000E+00
The ninth surface K = −2.421E+09, A2 = 0.0000E+00, A4 = −7.8144E−03,
A6 = −1.5147E−03 A8 = 1.0785E−04, A10 = 0.0000E+00
The tenth surface K = −3.3051, A2 = 0.0000E+00, A4 = −1.0433E−02,
A6 = 7.3724E−04, A8 = 1.2763E−05, A10 = 0.0000E+00
The eleventh surface K = −0.0125, A2 = 0.0000E+00, A4 = 1.7258E−02,
A6 = 9.4367E−04, A8 = 5.8476E−05, A10 = 0.0000E+00

Various data
Zoom ratio: 2.85

|  | Wide angle end | Middle | Telephoto end |
|---|---|---|---|
| Focal length | 4.7011 | 7.8996 | 13.3988 |
| F number | 3.3823 | 3.7805 | 5.1680 |
| Half angle of view | 34.72 | 20.99 | 12.68 |
| Image height | 2.9 | 2.9 | 2.9 |
| The total length of lens | 16.0002 | 15.9996 | 16.0003 |
| BF | 0.9634 | 2.6770 | 5.1735 |
| D3 | 5.85008 | 3.45351 | 0.39989 |
| D8 | 1.26083 | 2.89080 | 3.77807 |
| D10 | 1.89171 | 0.94414 | 0.61473 |
| D12 | 0.30013 | 2.01345 | 4.50995 |
| Effective diameter of the sixth surface | 0.88788 | 1.18949 | 1.22166 |
| Entrance pupil position | 5.0155 | 3.9387 | 2.0679 |
| Exit pupil position | −3.6146 | −4.8969 | −5.7146 |
| Position of front side principal point | 4.8892 | 3.5991 | −1.0232 |
| Position of rear side principal point | −4.3016 | −7.4998 | −13.0000 |

Single lens data

| Lens | The first surface of single lens | Focal length |
|---|---|---|
| 1 | 1 | −10.6167 |
| 2 | 2 | 59.0167 |
| 3 | 4 | 5.1007 |
| 4 | 7 | −11.0019 |
| 5 | 9 | 5.3289 |
| 6 | 11 | −5.1375 |

Zoom lens group data

| Group | The first surface of lens group | Focal length | Length of lens constitution | Magnification (Wide angle end) |
|---|---|---|---|---|
| 1 | 1 | −12.87628 | 1.02645 | 0 |
| 2 | 4 | 6.95157 | 2.73807 | −0.64386 |
| 3 | 9 | 5.32891 | 1.68341 | 0.45549 |
| 4 | 11 | −5.13748 | 0.45000 | 1.24490 |

-continued

Unit: mm

| Group | The first surface of lens group | Magnification (Telephoto end) | Position of front side principal point | Position of rear side principal point |
|---|---|---|---|---|
| 1 | 1 | 0 | 0.24870 | −0.39387 |
| 2 | 4 | −1.30020 | −1.37194 | −2.70632 |
| 3 | 9 | 0.38771 | 1.08992 | 0.00001 |
| 4 | 11 | 2.06439 | −0.00072 | −0.29474 |

Numerical Embodiment 5

Unit: mm

Surface data

| Surface No. | r | d | nd | vd | Effective diameter |
|---|---|---|---|---|---|
| Object plane | ∞ | ∞ | 1. | | |
| 1* | −13.6017 | 0.8479 | 1.58913 | 61.14 | 3.660 |
| 2* | 18.1293 | variable | 1. | | 3.200 |
| 3* | 2.8850 | 1.7753 | 1.54454 | 55.90 | 1.722 |
| 4* | −8.691E+04 | 0.2000 | 1. | | 1.291 |
| 5 (Stop) | ∞ | 0.2500 | 1. | | variable |
| 6* | 10.3480 | 1.5824 | 1.62980 | 19.20 | 0.888 |
| 7* | 3.6729 | variable | 1. | | 1.050 |
| 8* | −2.357E+05 | 1.6601 | 1.54454 | 55.90 | 2.024 |
| 9* | −2.7120 | variable | 1. | | 2.269 |
| 10* | −2.8308 | 0.4500 | 1.53071 | 55.67 | 2.491 |
| 11* | −1105.8789 | variable | 1. | | 2.712 |
| 12 | ∞ | 0.4000 | 1.51633 | 64.14 | 2.928 |
| 13 | ∞ | 0.4004SZ | 1. | | 2.961 |
| Image plane | ∞ | 0 | | | |

Aspherical surface data

The first surface

K = 2.7345, A2 = 0.0000E+00, A4 = 3.2861E−03, A6 = −2.9050E−04,
A8 = 1.1005E−05, A10 = −1.2267E−07
The second surface K = 10.7103, A2 = 0.0000E+00, A4 = 2.6994E−03, A6 = −3.7561E−04,
A8 = 1.2765E−05, A10 = 1.2555E−25
The third surface K = −1.1346, A2 = 0.0000E+00, A4 = 5.9089E−03, A6 = −4.6343E−04,
A8 = 2.5707E−04, A10 = −6.6971E−05
The fourth surface K = −2.339E+09, A2 = 0.0000E+00, A4 = 8.0924E−03,
A6 = −4.2987E−03, A8 = 0.0000E+00, A10 = 0.0000E+00
The sixth surface K = 61.1724, A2 = 0.0000E+00, A4 = −5.5183E−03, A6 = −1.0917E−02,
A8 = 4.3950E−03, A10 = 3.1352E−03
The seventh surface K = 0.0484, A2 = 0.0000E+00, A4 = 2.6608E−03, A6 = −3.5787E−03,
A8 = 7.2654E−04, A10 = 0.0000E+00
The eighth surface K = −2.131E+09, A2 = 0.0000E+00, A4 = −7.2078E−03,
A6 = −2.0410E−03, A8 = 3.8621E−04, A10 = 0.0000E+00
The ninth surface K = −1.3594, A2 = 0.0000E+00, A4 = −8.1336E−04,
A6 = −7.1326E−04 A8 = 2.1947E−04, A10 = 0.0000E+00
The tenth surface K = −0.0933, A2 = 0.0000E+00, A4 = 1.8203E−02, A6 = 8.6950E−04,
A8 = 1.4633E−06, A10 = 0.0000E+00

Unit: mm

The eleventh surface

K = 2.597E+04, A2 = 0.0000E+00, A4 = 2.3420E−03,
A6 = −5.4788E−04, A8 = 2.8440E−05, A10 = 0.0000E+00

Various data
Zoom ratio: 2.85

|  | Wide angle end | Middle | Telephoto end |
|---|---|---|---|
| Focal length | 4.7036 | 7.8996 | 13.3983 |
| F number | 3.2498 | 3.6609 | 5.0666 |
| Half angle of view | 35.32 | 21.18 | 12.96 |
| Image height | 2.9 | 2.9 | 2.9 |
| The total length of lens | 16.0003 | 15.9991 | 16.0010 |
| BF | 0.9160 | 2.4269 | 4.3103 |
| D2 | 5.97058 | 3.59340 | 0.44700 |
| D7 | 0.51917 | 2.32881 | 3.87980 |
| D9 | 1.69271 | 0.74817 | 0.46198 |
| D11 | 0.25180 | 1.76220 | 3.64720 |
| Effective diameter of the sixth surface | 0.88788 | 1.18949 | 1.22166 |
| Entrance pupil position | 5.2196 | 4.1976 | 2.3665 |
| Exit pupil position | −3.3561 | −5.0083 | −6.8197 |
| Position of front side principal point | 4.7445 | 3.7041 | −0.3641 |
| Position of rear side principal point | −4.3032 | −7.4987 | −12.9990 |

Single lens data

| Lens | The first surface of single lens | Focal length |
|---|---|---|
| 1 | 1 | −13.0616 |
| 2 | 3 | 5.2980 |
| 3 | 6 | −9.9524 |
| 4 | 8 | 4.9804 |
| 5 | 10 | −5.3484 |

Zoom lens group data

| Group | The first surface of lens group | Focal length | Length of lens constitution | Magnification (Wide angle end) |
|---|---|---|---|---|
| 1 | 1 | −13.06162 | 0.84794 | 0 |
| 2 | 3 | 6.66529 | 3.80768 | −0.63551 |
| 3 | 8 | 4.98037 | 1.66007 | 0.46205 |
| 4 | 10 | −5.34845 | 0.45000 | 1.22638 |

| Group | The first surface of lens group | Magnification (Telephoto end) | Position of front side principal point | Position of rear side principal point |
|---|---|---|---|---|
| 1 | 1 | 0 | 0.22648 | −0.30187 |
| 2 | 3 | −1.34260 | −2.18076 | −3.50860 |
| 3 | 8 | 0.41054 | 1.07481 | 0.00001 |
| 4 | 10 | 1.86102 | −0.00075 | −0.29478 |

Numerical Embodiment 6

Unit: mm

Surface data

| Surface No. | r | d | nd | vd |
|---|---|---|---|---|
| 1 | ∞ | 0.00 | | |
| 2* | 11.672 | 0.60 | 1.86400 | 40.58 |
| 3* | 4.093 | 2.24 | | |
| 4 | ∞ | 5.90 | 1.88300 | 40.76 |
| 5 | ∞ | 0.05 | | |
| 6 | 3.765 | 0.80 | 2.00270 | 19.32 |
| 7 | 3.577 | D7 | | |
| 8* | 3.612 | 1.18 | 1.49700 | 81.54 |
| 9* | −9.683 | 0.15 | | |
| 10 (Stop) | ∞ | 0.20 | | |
| 11 | 9.866 | 1.00 | 1.72916 | 54.68 |
| 12 | −8.746 | 1.00 | 1.59270 | 35.31 |
| 13 | 3.204 | D13 | | |
| 14* | 48.597 | 1.20 | 1.49700 | 81.54 |
| 15* | −3.485 | D15 | | |
| 16* | −3.953 | 0.45 | 1.86400 | 40.58 |
| 17* | −25.575 | D17 | | |
| 18 | ∞ | 0.50 | | |
| 19 | ∞ | 0.30 | 1.51633 | 64.14 |
| 20 | ∞ | D20 | | |

Aspherical surface data

The second surface

K = 0.000, A2 = 0.00000E+00, A4 = 6.88505E−04, A6 = 0.0000E+00,
A8 = 0.00000E+00, A10 = 0.00000E+00

The third surface

K = 0.000, A2 = 0.00000E+00, A4 = 2.08932E−04, A6 = 7.85502E−05,
A8 = −1.17154E−06, A10 = 0.00000E+00

The eighth surface

K = 0.000, A2 = 0.00000E+00, A4 = −1.67830E−03, A6 = 3.79238E−04,
A8 = 0.00000E+00, A10 = 0.00000E+00

The ninth surface

K = 0.000, A2 = 0.00000E+00, A4 = 3.44945E−03, A6 = 5.80105E−04,
A8 = 0.00000E+00, A10 = 0.00000E+00

The fourteenth surface

K = 0.000, A2 = 0.00000E+00, A4 = −3.89612E−03,
A6 = −1.33200E−03, A8 = 0.00000E+00, A10 = 0.00000E+00

The fifteenth surface

K = 0.000, A2 = 0.00000E+00, A4 = 1.00000E−03, A6 = −1.15519E−03,
A8 = 0.00000E+00, A10 = 0.00000E+00

The sixteenth surface

K = 0.000, A2 = 0.00000E+00, A4 = −9.62673E−03,
A6 = −9.50932E−05, A8 = 4.95200E+05, A10 = 0.00000E+00

The seventeenth surface

K = 0.000, A2 = 0.00000E+00, A4 = −1.09946E−04, A6 = 0.00000E−00,
A8 = 7.53191E+06, A10 = 0.0000E+00

Various data
Zooming data

|  | Wide angle end | Middle | Telephoto end |
|---|---|---|---|
| Focal length | 3.54 | 5.57 | 9.71 |
| F-numbe | 3.07 | 4.31 | 6.22 |
| Angle of view | 79.63 | 56.32 | 33.61 |
| D7 | 5.56 | 3.59 | 0.45 |
| D13 | 1.13 | 2.33 | 3.88 |
| D15 | 1.70 | 0.75 | 0.46 |
| D17 | 0.05 | 1.76 | 3.65 |
| D20 | 0.50 | 0.50 | 0.50 |
| fb (in air) | 1.24 | 2.96 | 4.84 |
| Total length (in air) | 24.40 | 24.40 | 24.40 |

Focal lengths of respective groups

| First group | Second group | Third group | Fourth group |
|---|---|---|---|
| −8.33 | 6.33 | 6.59 | −5.46 |

|  | Wide angle end | Telephoto end |
|---|---|---|
| Focal length | 3.5392 | 9.71 |
| F-number | 3.07431 | 6.22152 |
| Half angle of view | −39.8153 | −16.8066 |
| Image height | 2.9 | 2.9 |

-continued

Unit: mm

| | | |
|---|---|---|
| Total length of lens | 24.5012 | 24.5006 |
| BF | 1.85 | 5.4472 |
| D7 | 5.55729 | 0.446997 |
| D13 | 1.13001 | 3.8798 |
| D15 | 1.70339 | 0.461985 |
| D17 | 0.55 | 4.1472 |
| Effective diameter of stop | 2.4 | 2.4 |
| Position of entrance pupil | 5.55901 | 4.32036 |
| Position of exit pupil | −3.65546 | −9.01636 |

Single lens data

| | The first surface of lens | Focal length |
|---|---|---|
| Lens | | |
| 1 | 2 | −7.57429 |
| 2 | 4 | 0 |
| 3 | 6 | 63.1735 |
| 4 | 8 | 5.45423 |
| 5 | 11 | 6.50569 |
| 6 | 12 | −3.83647 |
| 7 | 14 | 6.59382 |
| 8 | 16 | −5.46408 |
| Group | | |
| 1 | 1 | −8.33111 |
| 2 | 8 | 6.33231 |
| 3 | 14 | 6.59382 |
| 4 | 16 | −5.46408 |

Numerical Embodiment 7

Unit: mm

Surface data

| Surface No. | r | d | nd | vd |
|---|---|---|---|---|
| 1 | ∞ | 0.00 | | |
| 2 | 14.595 | 0.70 | 1.86400 | 40.58 |
| 3* | 4.600 | 2.29 | | |
| 4 | ∞ | 5.90 | 1.88300 | 40.76 |
| 5 | ∞ | 0.10 | | |
| 6 | 4.453 | 0.80 | 2.00270 | 19.32 |
| 7 | 4.354 | D7 | | |
| 8* | 3.447 | 1.62 | 1.49700 | 81.54 |
| 9* | 11.795 | 0.20 | | |
| 10 (Stop) | | 0.10 | | |
| 11 | 20.827 | 2.00 | 1.49700 | 81.54 |
| 12 | −5.237 | 0.10 | | |
| 13 | 27.070 | 1.50 | 1.76182 | 26.52 |
| 14 | 5.347 | D14 | | |
| 15* | −392.217 | 2.00 | 1.49700 | 81.54 |
| 16* | −3.454 | D16 | | |
| 17* | −3.515 | 0.50 | 1.67790 | 55.34 |
| 18 | −339.247 | D18 | | |
| 19 | ∞ | 0.50 | | |
| 20 | ∞ | 0.30 | 1.51633 | 64.14 |
| 21 | ∞ | D21 | | |

Aspherical surface data

The third surface

K = 0.000, A2 = 0.00000E+00, A4 = −4.47681E−04, A6 = 2.07738E−05, A8 = −2.43374E+06, A10 = 0.00000E+00

The eighth surface

K = 0.000, A2 = 0.00000E+00, A4 = 1.51023E−03, A6 = 3.74951E−04, A8 = 0.00000E+00, A10 = 0.00000E+00

-continued

Unit: mm

The ninth surface

K = 0.000, A2 = 0.00000E+00, A4 = 9.21667E−03, A6 = 1.15610E−03, A8 = 0.00000E+00, A10 = 0.00000E+00

The fifteenth surface

K = 0.000, A2 = 0.00000E+00, A4 = −5.75670E−03, A6 = −3.48055E−04, A8 = −1.14207E+04, A10 = 0.00000E+00

The sixteenth surface

K = 0.000, A2 = 0.00000E+00, A4 = 1.00000E−03, A6 = −6.35707E−04, A8 = 5.80470E+05, A10 = 0.00000E+00

The seventeenth surface

K = 0.000, A2 = 0.00000E+00, A4 = 5.60761E−03, A6 = −4.05610E−04, A8 = 1.05704E+04, A10 = 0.00000E+00

Various data
Zooming data

| | Wide angle end | Middle | Telephoto end |
|---|---|---|---|
| Focal length | 3.95 | 6.47 | 10.86 |
| F-number | 3.52 | 5.07 | 7.07 |
| Angle of view | 77.87 | 49.44 | 30.16 |
| D7 | 6.01 | 3.59 | 0.45 |
| D14 | 0.42 | 2.33 | 3.88 |
| D16 | 1.75 | 0.75 | 0.46 |
| D18 | 0.25 | 1.76 | 3.65 |
| D21 | 0.50 | 0.50 | 0.50 |
| fb (in air) | 1.45 | 2.96 | 4.84 |
| Total length (in air) | 27.43 | 27.43 | 27.43 |

Focal lengths of respective groups

| First group | Second group | Third group | Fourth group |
|---|---|---|---|
| −9.09 | 7.01 | 7.00 | −5.24 |

| | Wide angle end | Telephoto end |
|---|---|---|
| Focal length | 3.95285 | 10.8608 |
| F-number | 3.51929 | 7.06885 |
| Half angle of view | −38.9334 | −15.08 |
| Image height | 2.9 | 2.9 |
| Total length of lens | 27.5349 | 27.5343 |
| BF | 2.054635 | 5.4472 |
| D7 | 6.00536 | 0.446997 |
| D13 | 0.419895 | 3.8798 |
| D15 | 1.75453 | 0.461985 |
| D17 | 0.754635 | 4.1472 |
| Effective diameter of stop | 2.4 | 2.4 |
| Position of entrance pupil | 5.94675 | 4.64912 |
| Position of exit pupil | −4.15306 | −9.49037 |

Single lens data

| | The first surface of lens | Focal length |
|---|---|---|
| Lens | | |
| 1 | 2 | −8.03529 |
| 2 | 4 | 0 |
| 3 | 6 | 64.2999 |
| 4 | 8 | 9.20868 |
| 5 | 11 | 8.64034 |
| 6 | 12 | −9.01411 |
| 7 | 14 | 6.99915 |
| 8 | 16 | −5.24223 |
| Group | | |
| 1 | 1 | −9.09101 |
| 2 | 8 | 7.01063 |
| 3 | 14 | 6.99915 |
| 4 | 16 | −5.24223 |

Numerical Embodiment 8

Unit: mm

Surface data

| Surface No. | r | d | nd | vd |
|---|---|---|---|---|
| 1 | ∞ | 0.00 | | |
| 2* | 15.585 | 0.70 | 1.86400 | 40.58 |
| 3* | 4.443 | 1.55 | | |
| 4 | ∞ | 5.90 | 1.88300 | 40.76 |
| 5 | ∞ | 0.10 | | |
| 6 | 7.056 | 0.77 | 2.00270 | 19.32 |
| 7 | 8.202 | D7 | | |
| 8* | 3.647 | 1.27 | 1.49700 | 81.54 |
| 9* | 13.889 | 0.15 | | |
| 10 (Stop) | | 0.15 | | |
| 11 | 24.353 | 2.00 | 1.49700 | 81.54 |
| 12 | −5.948 | 0.10 | | |
| 13 | 35.719 | 2.00 | 1.76182 | 26.52 |
| 14 | 5.339 | D14 | | |
| 15* | 13.282 | 2.00 | 1.49700 | 81.54 |
| 16* | −3.692 | D16 | | |
| 17* | −3.474 | 0.50 | 1.67790 | 55.34 |
| 18* | 34.692 | D18 | | |
| 19 | ∞ | 0.50 | | |
| 20 | ∞ | 0.30 | 1.51633 | 64.14 |
| 21 | ∞ | D21 | | |

Aspherical surface data

The second surface

K = 0.000, A2 = 0.00000E+00, A4 = −3.33095E−04, A6 = 1.19653E−05, A8 = 0.00000E−00, A10 = 0.00000E−00

The third surface

K = 0.000, A2 = 0.00000E+00, A4 = −1.05386E−03, A6 = 3.95910E−06, A8 = −1.50081E−06 A10 = 0.00000E−00

The eighth surface

K = 0.000, A2 = 0.00000E+00, A4 = 3.02633E−03, A6 = 2.68826E−04, A8 = 1.02771E−04, A10 = 0.00000E−00

The ninth surface

K = 0.000, A2 = 0.00000E+00, A4 = 9.09002E−03, A6 = 6.83074E−04, A8 = 2.06543E−04, A10 = 0.00000E−00

The fifteenth surface

K = 0.000, A2 = 0.00000E+00, A4 = −6.19167E−03, A6 = 1.33195E−04, A8 = −2.07936E−04, A10 = 0.00000E−00

The sixteenth surface

K = 0.000, A2 = 0.00000E+00, A4 = 1.00000E−03, A6 = −5.21145E−04, A8 = −4.85216E−05, A10 = 0.00000E−00

The seventeenth surface

K = 0.000, A2 = 0.00000E+00, A4 = 7.04979E−03, A6 = −9.32933E−04, A8 = 1.70330E−05, A10 = 0.00000E−00

The eighteenth surface

K = 0.000, A2 = 0.00000E+00, A4 = −2.52136E−05, A6 = −4.06686E−04, A8 = 0.00000E−00, A10 = 0.00000E−00

Various data
Zooming data

| | Wide angle end | Middle | Telephoto end |
|---|---|---|---|
| Focal length | 3.95 | 6.60 | 10.86 |
| F-number | 2.89 | 4.29 | 6.02 |
| Angle of view | 76.98 | 48.56 | 30.19 |
| D7 | 6.18 | 3.59 | 0.45 |
| D14 | 0.50 | 2.33 | 3.88 |
| D16 | 1.63 | 0.75 | 0.46 |
| D18 | 0.13 | 1.76 | 3.65 |
| D21 | 0.50 | 0.50 | 0.50 |
| fb (in air) | 1.33 | 2.96 | 4.84 |
| Total length (in air) | 26.82 | 26.82 | 26.82 |

Focal lengths of respective groups

| First group | Second group | Third group | Fourth group |
|---|---|---|---|
| −10.19 | 7.72 | 6.05 | −4.63 |

| | Wide angle end | Telephoto end |
|---|---|---|
| Focal length | 3.95286 | 10.8612 |
| F-number | 2.89132 | 6.01745 |
| Half angle of view | −38.4911 | −15.0948 |
| Image height | 2.9 | 2.9 |
| Total length of lens | 26.9254 | 26.9249 |
| BF | 1.932692 | 5.4472 |
| D7 | 6.18336 | 0.446997 |
| D13 | 0.495045 | 3.8798 |
| D15 | 1.62534 | 0.461985 |
| D17 | 0.632692 | 4.1472 |
| Effective diameter of stop | 2.8 | 2.8 |
| Position of entrance pupil | 5.54161 | 4.11711 |
| Position of exit pupil | −3.89555 | −9.33921 |

Single lens data

| | The first surface of lens | Focal length |
|---|---|---|
| Lens | | |
| 1 | 2 | −7.40928 |
| 2 | 4 | 0 |
| 3 | 6 | 37.6476 |
| 5 | 13 | −8.48212 |
| 6 | 15 | 6.04975 |
| 7 | 17 | −4.63422 |
| Group | | |
| 1 | 1 | −10.1859 |
| 2 | 8 | 7.7192 |
| 3 | 15 | 6.04975 |
| 4 | 17 | −4.63422 |

Numerical Embodiment 9

Unit: mm

Surface data

| Surface No. | r | d | nd | vd |
|---|---|---|---|---|
| 1 | ∞ | 0.00 | | |
| 2* | 83.367 | 0.70 | 1.58913 | 61.14 |
| 3* | 4.520 | 1.68 | | |
| 4 | ∞ | 5.90 | 1.88300 | 40.76 |
| 5 | ∞ | 0.10 | | |
| 6 | 7.968 | 0.59 | 2.00270 | 19.32 |
| 7 | 8.926 | D7 | | |
| 8* | 3.089 | 1.26 | 1.49700 | 81.54 |
| 9* | 7.912 | 0.20 | | |
| 10 (Stop) | ∞ | 0.15 | | |
| 11 | 8.276 | 2.00 | 1.49700 | 81.54 |
| 12 | −8.782 | 0.20 | | |
| 13 | −18.700 | 1.00 | 1.76182 | 26.52 |
| 14 | 10.142 | D14 | | |
| 15* | 14.424 | 2.00 | 1.49700 | 81.54 |
| 16* | −3.318 | D16 | | |
| 17* | −3.171 | 0.50 | 1.67790 | 55.34 |
| 18* | 24.334 | D18 | | |
| 19 | ∞ | 0.50 | | |
| 20 | ∞ | 0.30 | 1.51633 | 64.14 |
| 21 | ∞ | D21 | | |

-continued

Unit: mm

Aspherical surface data

The second surface

K = 0.000, A2 = 0.00000E+00, A4 = 2.80070E−04, A6 = 2.00089E−06,
A8 = 0.00000E−00, A10 = 0.00000E−00
The third surface K = 0.000, A2 = 0.00000E+00, A4 = −3.02207E−04, A6 = 3.49282E−06,
A8 = −1.11996E−06, A10 = 0.00000E−00
The eighth surface K = 0.000, A2 = 0.00000E+00, A4 = 4.40211E−03, A6 = 1.72044E−06,
A8 = 2.92059E−04, A10 = 0.00000E−00
The ninth surface K = 0.000, A2 = 0.00000E+00, A4 = 1.15546E−02, A6 = 8.05482E−04,
A8 = 7.30863E−04, A10 = 0.00000E−00
The fifteenth surface K = 0.000, A2 = 0.00000E+00, A4 = −9.27827E−03,
A6 = −4.71297E−05, A8 = −1.82765E−04, A10 = 0.00000E−00
The sixteenth surface K = 0.000, A2 = 0.00000E+00, A4 = 1.00000E−03, A6 = −5.53076E−04,
A8 = −1.44585E−05, A10 = 0.00000E−00
The seventeenth surface K = 0.000, A2 = 0.00000E+00, A4 = 3.43219E−03, A6 = −7.83070E−04,
A8 = 5.00272E−05, A10 = 0.00000E−00
The eighteenth surface K = 0.000, A2 = 0.00000E+00, A4 = −6.48773E−03,
A6 = −1.80112E−05, A8 = 0.00000E−00, A10 = 0.00000E−00

Various data
Zooming data

|  | Wide angle end | Middle | Telephoto end |
|---|---|---|---|
| Focal length | 3.95 | 6.48 | 10.86 |
| F-number | 2.89 | 4.29 | 6.02 |
| Angle of view | 76.48 | 50.67 | 30.92 |
| D7 | 5.93 | 3.59 | 0.45 |
| D14 | 0.86 | 2.33 | 3.88 |
| D16 | 1.52 | 0.75 | 0.46 |
| D18 | 0.12 | 1.76 | 3.65 |
| D21 | 0.50 | 0.50 | 0.50 |
| fb (in air) | 1.31 | 2.96 | 4.84 |
| Total length (in air) | 25.92 | 25.92 | 25.92 |

Focal lengths of respective groups

| First group | Second group | Third group | Fourth group |
|---|---|---|---|
| −10.14 | 7.62 | 5.64 | −4.11 |

|  | Wide angle end | Telephoto end |
|---|---|---|
| Focal length | 3.95286 | 10.8592 |
| F-number | 2.89132 | 6.01745 |
| Half angle of view | −38.2388 | −15.4611 |
| Image height | 2.9 | 2.9 |
| Total length of lens | 26.0181 | 26.018 |
| BF | 1.916145 | 5.4472 |
| D7 | 5.92995 | 0.446997 |
| D13 | 0.86491 | 3.8798 |
| D15 | 1.52447 | 0.461985 |
| D17 | 0.616145 | 4.1472 |
| Effective diameter of stop | 2.8 | 2.8 |
| Position of entrance pupil | 5.62901 | 4.25488 |
| Position of exit pupil | −3.791 | −8.88767 |

-continued

Unit: mm

Single lens data

| Lens | The first surface of lens | Focal length |
|---|---|---|
| 1 | 2 | −8.13855 |
| 2 | 4 | 0 |
| 3 | 6 | 56.6213 |
| 4 | 8 | 9.37919 |
| 5 | 11 | 8.91998 |
| 6 | 13 | −8.50399 |
| 7 | 15 | 5.63822 |
| 8 | 17 | −4.10767 |
| Group |  |  |
| 1 | 1 | −10.1366 |
| 2 | 8 | 7.62047 |
| 3 | 15 | 5.63822 |
| 4 | 17 | −4.10767 |

Next, values which the embodiment 1 (the numeral embodiment 1), the embodiment 2 (the numeral embodiment 2), the embodiment 3 (the numeral embodiment 3), the embodiment 4 (the numeral embodiment 4), the embodiment 5 (the numeral embodiment 5) the embodiment 6 (the numeral embodiment 6), the embodiment 7 (the numeral embodiment 7), the embodiment 8 (the numeral embodiment 8), and the embodiment 9 (the numeral embodiment 9) have in the conditions (1) to (10) are given. However, because the embodiments 7, 8, and 9 do not include a cemented lens, the embodiments 7, 8, and 9 have no applicable values for the conditions (1) to (3) (but, excepting the embodiment 6). Also, because the embodiments 6 to 9 are out of the conditions (4) to (6), the embodiments 6 to 9 have no applicable values for the conditions (4) to (6). Also, because the embodiments 1 to 5 do not include an optical element for bending light paths, the embodiments 1 to 5 have no applicable values for these conditions.

Values which the embodiments have in the respective conditions

|  | Embodiment 1 | Embodiment 2 | Embodiment 3 | Embodiment 4 | Embodiment 5 |
|---|---|---|---|---|---|
| Condition (1) | 301.977 | 180.506 | 99.467 | 80.93 | — |
| Condition (2) | 301.977 | 180.506 | 99.467 | — | — |
| Condition (3) | 28.870 | 32.290 | — | — | — |
| Condition (4) max | 1.633 | 1.633 | 1.633 | 1.633 | 1.633 |
| Condition (4) min | 1.530 | 1.544 | 1.544 | 1.530 | 1.530 |
| Condition (5) max | 0.0025 | — | — | — | — |
| Condition (6) | 0.065 | — | — | — | — |
| Condition (7) | — | — | — | — | — |
| Condition (8) | — | — | — | — | — |
| Condition (9) | −1.53 | −1.59 | −1.48 | −1.62 | −1.65 |
| Condition (10) | 2.21 | 2.43 | 2.51 | 2.38 | 2.61 |

|  | Embodiment 6 | Embodiment 7 | Embodiment 8 | Embodiment 9 |
|---|---|---|---|---|
| Condition (1) | — | — | — | — |
| Condition (2) | — | — | — | — |
| Condition (3) | 19.37 | — | — | — |
| Condition (4) max | — | — | — | — |

-continued

| | | | | |
|---|---|---|---|---|
| Condition (4) min | — | — | — | — |
| Condition (5) max | — | — | — | — |
| Condition (6) | — | — | — | — |
| Condition (7) | 2.1 | 1.9 | 1.8 | 1.1 |
| Condition (8) | 21.3 | 21.3 | 21.3 | 41.8 |
| Condition (9) | −1.3 | −1.2 | −1.1 | −1.0 |
| Condition (10) | 2.2 | 2.0 | 2.1 | 2.1 |

Zoom lens system according to the present invention as described above can be used for image pickup devices, such as digital camera and video camera, in which shooting is performed by forming on an image sensor like CCD an object image that is formed by the zoom lens system. A concrete example of the image pickup devices is given below.

Figure 19:
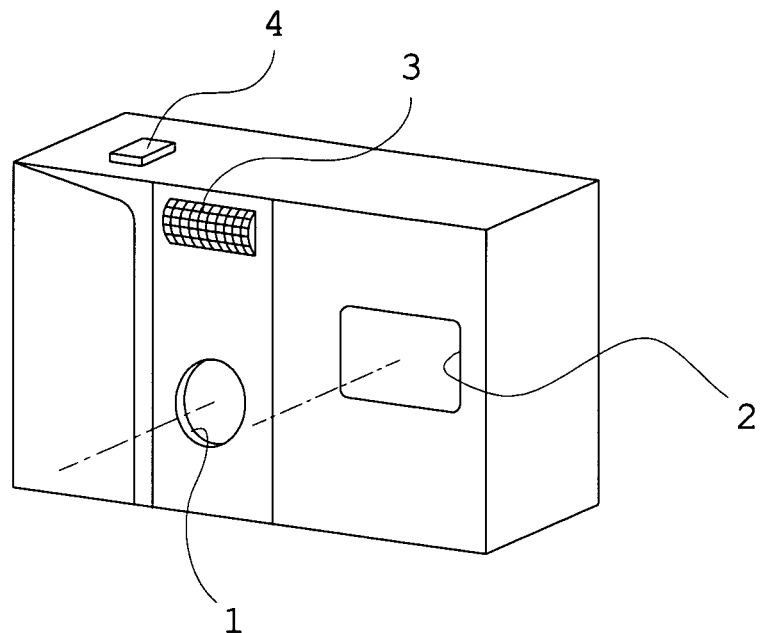
FIG. 19 is a front perspective view showing the appearance of a digital camera into which a zoom lens system according to the present invention is incorporated.
Figure 20:
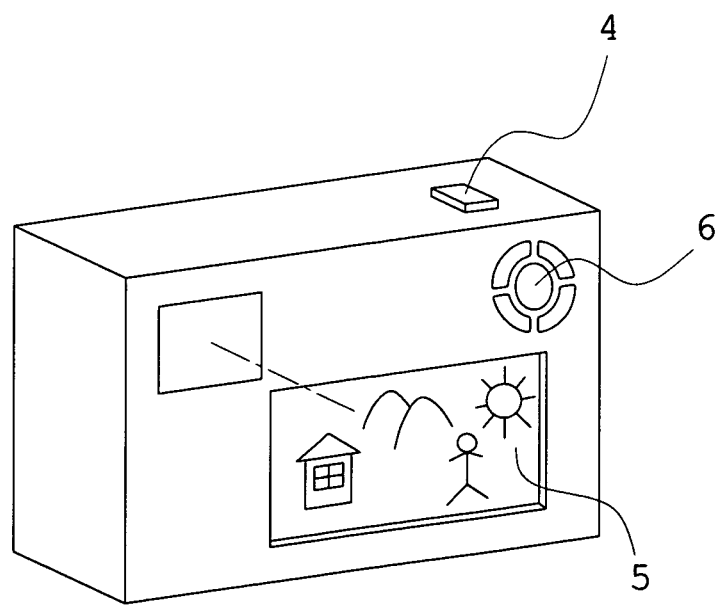
FIG. 20 is a rear perspective view showing the appearance of the digital camera which is shown in FIG. 19.
Figure 21:
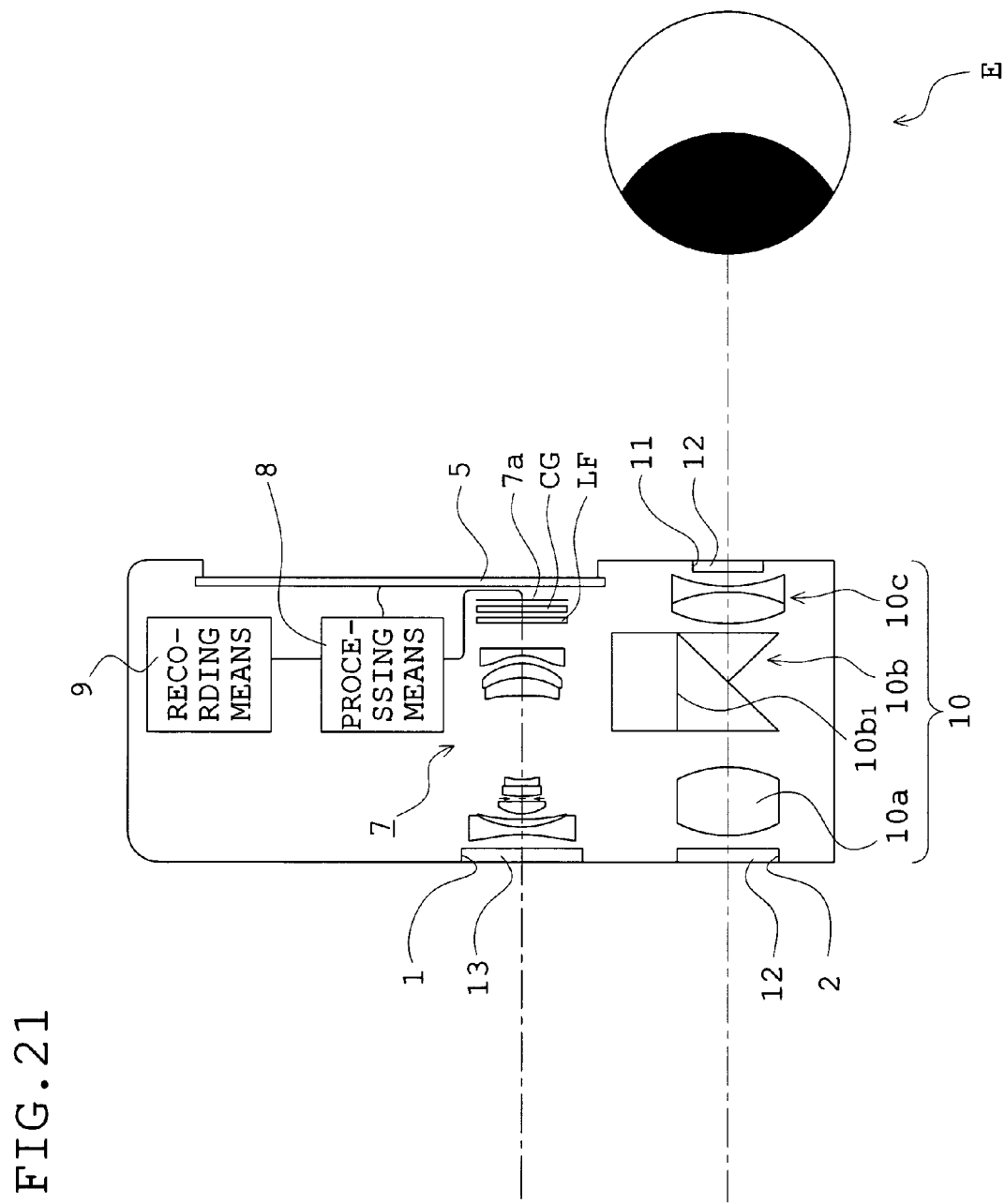
FIG. 21 is a perspective view schematically showing the constitution of the digital camera which is shown in FIG. 19.

FIGS. 19, 20, and 21 are conceptual views showing the constitution of a digital camera using the present invention, FIG. 19 is a front perspective view showing the appearance of a digital camera, FIG. 20 is a rear perspective view showing the appearance of the digital camera which is shown in FIG. 19, and FIG. 21 is a perspective view schematically showing the constitution of the digital camera.

The digital camera is provided with an opening section 1 for shooting, a finder opening section 2, and a flash-firing section 3 on the front side of the digital camera. Also, the digital camera is provided with a shutter button 4 on the top of the digital camera. Also, the digital camera is provided with a liquid crystal display monitor 5 and an information input section 6 on the rear side of the digital camera. In addition, the digital camera is provided with a zoom lens system 7, a processing means 8, a recording means 9, and a finder optical system 10 inside the digital camera. Also, cover members 12 are arranged in the finder opening section 2 and in an opening section 11 that is located on the exit side of the finder optical system 10 and is provided on the rear side of the digital camera. In addition, a cover member 13 is also arranged in the opening section 1 for shooting.

When the shutter button 4 which is arranged on the top of the digital camera is pressed, shooting is performed through the zoom lens system 7, for example, through such a zoom lens system as is described in the embodiment 1 of the present invention, in response to the pressing of the shutter button 4. An object image is formed on the image forming plane of a CCD 7a that is a solid-state image sensor, through the zoom lens system 7, a low pass filter LF, and the cover glass CG The image information on the object image which is formed on the image forming plane of the CCD 7a is recorded on the recording means 9 through the processing means 8. Also, recorded image information is taken through the processing means 8, and the image information can be also displayed as an electronic image on the liquid crystal display monitor 5 which is provided on the rear side of the digital camera.

Also, the finder optical system 10 is composed of a finder objective optical system 10a, an erecting prism 10b, and an eyepiece optical system 10c. Light from an object which enters through the finder opening section 2 is led to the erecting prism 10b that is a member for erecting an image, by the finder objective optical system 10a, and an object image is formed as an erect image in the view finder frame $10b_1$, and, afterward, the object image is led to an eye E of an observer by the eyepiece optical system 10c.

Digital cameras which are formed in such a manner secure good performances while it is possible to achieve downsizing of the digital cameras, because the zoom lens system 7 has a high magnification ratio and is small.

The present invention can offer a zoom lens system which has good optical properties and is small, excels in cost performance, and compact, and an image pick up device having the same. And, the present invention is favorably applicable to various kinds of digital cameras and so on and is extremely useful in practical use.

What is claimed is:

1. A zoom lens system comprising, a first lens group with negative refractive power, a second lens group with positive refractive power, a third lens group with positive refractive power, and a fourth lens group with negative refractive power which are arranged in turn from the object side toward the image side, wherein, in performing a zooming operation from the wide angle end position to the telephoto end position, the first lens group keeps still, the distance between the first and second lens groups becomes small, the distance between the second and third lens groups becomes wide, and the distance between the third and fourth lens groups becomes small;

wherein the first lens group is a cemented lens which is formed by joining a first lens element and a second lens element that are arranged in turn from the object side, and the first lens element and the second lens element satisfy the following condition:

$$70 < \nu_{deff} < 350$$

where $\nu_{deff} = 1/[f_t \cdot (\phi 1/\nu f1 + \phi 2/\nu f2)]$, νf1 denotes the Abbe's number of the first lens element, νf2 denotes the Abbe's number of the second lens element, $f_t$ denotes the focal length of the cemented lens, $\phi 1 = 1/f1$ (where f1 denotes the focal length of the first lens element), $\phi 2 = 1/f2$ (where f2 denotes the focal length of the second lens element), and the Abbe's numbers are (nd−1)/(nf−nC).

2. A zoom lens system according to claim 1, wherein the shape of the border surface between the first lens element and the second lens element is a shape of aspherical surface.

3. A zoom lens system according to claim 1, wherein an aperture stop is arranged between the first lens group and the third lens group, and the aperture diameter of the aperture stop in the telephoto end position becomes larger than the aperture diameter of the aperture stop in the wide angle end position.

4. A zoom lens system according to claim 1, wherein the refractive indices of all of glass materials for the lens elements constituting optical system satisfy the following condition:

$$1.45 < nd < 1.65$$

where nd denotes refractive index with respect to the d line.

5. A zoom lens system according to claim 1, wherein the shape of the nearest surface to the image side in the third lens group is a convex shape that faces toward the image plane, and the air spacing between the third lens group and the fourth lens group satisfies the following conditions:
when Rn<0.35

$$|dG3G4(Rn)/f1(w)-0.37|<0.00300$$

when Rn=0.35 or Rn=0.5

$$|dG3G4(Rn=0.5)/f1(w)-dG3G4(Rn=0.35)/f1(w)|>0.004$$

where dG3G4(Rn=0.5) denotes the air spacing between the third lens group and fourth lens group in the case where Rn=0.5, dG3G4(Rn=0.35) denotes the air spacing between the third lens group and fourth lens group in the case where Rn=0.35, and Rn=|RG3/f1(w)|(that is to say, Rn is obtained by normalizing a distance RG3 from optical axis at the nearest surface to the image side in the third lens group by the focal length f1(w) in the wide angle end position).

6. A zoom lens system according to claim 1, wherein the first lens group includes a cemented lens which is formed by joining two lens elements of a first lens element and a second lens element that are arranged in turn from the object side, and the shape of the border surface between the first lens element and the second lens element is a shape of aspherical surface.

7. A zoom lens system according to claim 1, wherein the first lens group includes a negative lens, a reflection optical element for bending optical paths, and a positive lens, in that order from the object side toward the image side.

8. A zoom lens system according to claim 7, wherein the following conditions are satisfied:

$$0.5 < (R11 + R12)/(R11 - R12) < 4.2$$

$$16 < v1 - v2 < 54$$

where R11 denotes the radius of curvature of the object-side surface of the negative lens, R12 denotes the radius of curvature of the image-side surface of the negative lens, v1 denotes the Abbe's number of the negative lens, and v2 denotes the Abbe's number of the positive lens.

9. A zoom lens system according to claim 1, wherein the following condition is satisfied:

$$-2.5 < f_{G1}/\sqrt{(fw \cdot ft)} < -0.5$$

where $f_{G1}$ denotes the focal length of the first lens group, and fw and ft denote the focal lengths of the whole optical system in the wide angle end position and in the telephoto end position, respectively.

10. A zoom lens system according to claim 1, wherein the following condition is satisfied:

$$1.0 < EX\_Tele/EX\_Wide < 4.3$$

where EX_Wide denotes the distance from the image plane to the exit pupil in the wide angle end position, and EX_Tele denotes the distance from the image plane to the exit pupil in the telephoto end position.

11. An image pickup device comprising the zoom lens system according to claim 1 and an electronic image sensor.

* * * * *